(12) United States Patent
Matsumori et al.

(10) Patent No.: US 8,512,819 B2
(45) Date of Patent: Aug. 20, 2013

(54) LIQUID CRYSTAL DISPLAY DEVICE

(75) Inventors: Masaki Matsumori, Tokai Naka-gun (JP); Yasushi Tomioka, Hitachinaka (JP)

(73) Assignees: Hitachi Displays, Ltd., Chiba-Ken (JP); Panasonic Liquid Crystal Display Co., Ltd., Hyogo-Ken (JP)

( * ) Notice: Subject to any disclaimer, the term of this patent is extended or adjusted under 35 U.S.C. 154(b) by 48 days.

(21) Appl. No.: 12/805,835

(22) Filed: Aug. 20, 2010

(65) Prior Publication Data
US 2011/0051064 A1    Mar. 3, 2011

(30) Foreign Application Priority Data

Aug. 31, 2009 (JP) .................. 2009-200758

(51) Int. Cl.
| | | |
|---|---|---|
| *C09K 19/00* | (2006.01) | |
| *C09K 19/06* | (2006.01) | |
| *C09K 19/34* | (2006.01) | |
| *C09K 19/52* | (2006.01) | |

(52) U.S. Cl.
USPC ......... 428/1.1; 428/1.2; 428/1.3; 252/299.01; 349/1; 349/56

(58) Field of Classification Search
USPC .................. 428/1.1, 1.2, 1.3; 430/20; 349/1, 349/123, 167, 56; 252/299.01
See application file for complete search history.

(56) References Cited

U.S. PATENT DOCUMENTS

| | | | |
|---|---|---|---|
| 5,600,464 | A | 2/1997 | Ohe et al. |
| 5,666,217 | A | 9/1997 | Kaneko et al. |
| 5,831,705 | A | 11/1998 | Kaneko et al. |
| 6,704,082 | B2 | 3/2004 | Tomioka et al. |
| 6,844,907 | B2 | 1/2005 | Ohe et al. |
| 6,943,861 | B2 | 9/2005 | Tomioka et al. |
| 2007/0237488 | A1* | 10/2007 | Oh et al. ............. 385/147 |

FOREIGN PATENT DOCUMENTS

| | | |
|---|---|---|
| JP | 60-146226 | 8/1985 |
| JP | 02-100343 | 4/1990 |
| JP | 3-41418 | 2/1991 |
| JP | 7-159786 | 6/1995 |
| JP | 8-262447 | 10/1996 |
| JP | 2001-281671 | 10/2001 |
| JP | 2003-115481 | 4/2003 |
| JP | 2006-351613 | 12/2006 |
| JP | 2008-216858 | 9/2008 |

OTHER PUBLICATIONS

Official Action for Japanese Patent Application No. 2009-200758 dated Jun. 5, 2012.

* cited by examiner

*Primary Examiner* — Geraldina Visconti
(74) *Attorney, Agent, or Firm* — Antonelli, Terry, Stout & Kraus, LLP.

(57) ABSTRACT

Provided is a liquid crystal display device includes: a first substrate (6); a second substrate (7); a liquid crystal layer (LC); a first alignment film (606) placed on the first substrate; a second alignment film (705) placed on the second substrate; and at least one of: a transparent layer (610) contacting the first alignment film on the other side of the liquid crystal layer and being lower in volume resistivity than the first alignment film; and a transparent layer (710) contacting the second alignment film on the other side of the liquid crystal layer and being lower in volume resistivity than the second alignment film, wherein the transparent layer contains polysiloxane expressed by Chemical Formula 1:

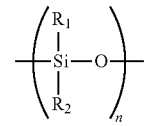

where R1 and R2 each represent an alkyl group or alkoxy group having 1 to 3 carbon atoms, or a hydroxyl group, and at least 30% of hydroxyl groups are contained.

4 Claims, 16 Drawing Sheets

LIQUID CRYSTAL DISPLAY DEVICE

CROSS-REFERENCE TO RELATED APPLICATION

The present application claims priority from Japanese application JP2009-200758 filed on Aug. 31, 2009, the content of which is hereby incorporated by reference into this application.

BACKGROUND OF THE INVENTION

1. Field of the Invention

The present invention relates to a liquid crystal display device that includes an alignment film for aligning liquid crystal molecules in a liquid crystal layer which is sandwiched between two substrates.

2. Description of the Related Art

Liquid crystal display devices are being applied to increasingly wide range of uses because of their features such as high display quality, thinness, light weight, and low power consumption. The various uses of liquid crystal display devices include monitors for portable devices, e.g., cell phone monitors and digital still camera monitors, monitors for desktop personal computers, monitors for printing and designing, monitors for medical practice, and liquid crystal television sets. The expansion of uses has brought about demands for liquid crystal display devices that are even higher in image quality and product quality, and there are particularly strong demands for higher luminance, which is to be accomplished by enhancing the transmittance, and for lower power consumption. A demand for lower cost is also increasing as liquid crystal display devices grow popular.

A liquid crystal display device usually displays an image or the like by applying an electric field to liquid crystal molecules in a liquid crystal layer sandwiched between a pair of substrates, which changes the alignment direction of the liquid crystal molecules and consequently changes the optical characteristics of the liquid crystal layer. The direction in which the liquid crystal molecules are aligned during no-electric field application is controlled by an alignment film obtained by subjecting a surface of a thin polyimide film to rubbing treatment. Conventionally, an active drive liquid crystal display device, which includes a switching element such as a thin-film transistor (TFT) for each pixel, includes electrodes on both of two substrates paired to sandwich a liquid crystal layer, in order to apply a vertical field, i.e., an electric field oriented substantially perpendicular to the substrate plane, to the liquid crystal layer, and displays an image or the like by utilizing the optical rotatory power of liquid crystal molecules that constitute the liquid crystal layer. A typical vertical field type liquid crystal display device is a twisted nematic (TN) liquid crystal display device. One of major problems of TN liquid crystal display devices is their narrow viewing angle. Known display methods that widen the viewing angle include in-plane switching (IPS) and fringe field switching (FFS). IPS and FFS are lateral field display methods in which a comb tooth-shaped electrode is formed on one of paired substrates and a generated electric field includes a component substantially parallel to the substrate plane. An IPS or FFS liquid crystal display device displays an image or the like by rotating liquid crystal molecules that constitute a liquid crystal layer within a plane substantially parallel to substrates and utilizing the birefringence of the liquid crystal layer. IPS and FFS liquid crystal display devices, which involve in-plane switching of liquid crystal molecules, have such advantages over conventional TN liquid crystal display devices as wider viewing angle and smaller load capacity and, in recent years, are advancing rapidly as promising new liquid crystal display devices to replace TN liquid crystal display devices.

Whichever display method a liquid crystal display device uses, an image sticking phenomenon of a displayed image happens in some cases. Japanese Patent Application Laid-open No. 2008-216858 states that FFS liquid crystal display devices are prone to the image sticking phenomenon due to the asymmetric electrode structure, and describes a solution to this matter.

SUMMARY OF THE INVENTION

In liquid crystal display devices, image sticking may happen when, for example, the same image is kept displayed for a long time, and the image faintly remains on the screen after the screen switches to the next image. It is therefore an object of the present invention to provide a liquid crystal display device in which image sticking is inhibited.

In order to solve the above-mentioned problem, a liquid crystal display device according to the present invention includes: a first substrate; a second substrate; a liquid crystal layer interposed between the first substrate and the second substrate; a pixel electrode placed on the first substrate for applying an electric field to the liquid crystal layer to control liquid crystal molecules; a first alignment film placed on the first substrate; a second alignment film placed on the second substrate; and at least one of: a transparent layer that is in contact with an opposite side of the first alignment film from the liquid crystal layer and that is lower in volume resistivity than the first alignment film; and a transparent layer that is in contact with an opposite side of the second alignment film from the liquid crystal layer and that is lower in volume resistivity than the second alignment film, in which the transparent layer contains polysiloxane expressed by the following general formula [Chemical Formula 2]:

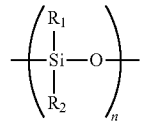

[Chemical Formula 2]

where R1 and R2 each represent an alkyl group or alkoxy group having 1 to 3 carbon atoms, or a hydroxyl group, and at least 30% of hydroxyl groups are contained.

Further, in order to solve the above-mentioned problem, a liquid crystal display device according to the present invention includes: a first substrate; a second substrate; a liquid crystal layer interposed between the first substrate and the second substrate; a pixel electrode placed on the first substrate for applying an electric field to the liquid crystal layer to control liquid crystal molecules; a first alignment film placed on the first substrate; a second alignment film placed on the second substrate; and at least one of: a transparent layer that is in contact with an opposite side of the first alignment film from the liquid crystal layer and that is lower in volume resistivity than the first alignment film; and a transparent layer that is in contact with an opposite side of the second alignment film from the liquid crystal layer and that is lower in volume resistivity than the second alignment film, in which the transparent layer is formed from an organic resin material selected from the group consisting of polyisothianaphthene, poly-3,4-ethylenedioxythiophene, and polypyrrole.

Further, in one aspect of the liquid crystal display device according to the present invention, the transparent layer may have a volume resistivity of 1.0E+9 Ωcm or more and 5.0E+13 Ωcm or less, at least one of the first alignment film and the second alignment film may be in contact with the transparent layer, and the at least one of the first alignment film and the second alignment film may have a volume resistivity of 1.0E+14 Ωcm or more.

Further, in one aspect of the liquid crystal display device according to the present invention, the transparent layer may contain fine particles of at least one of silica and metal.

Further, in one aspect of the liquid crystal display device according to the present invention, the liquid crystal layer may have has a volume resistivity of 1.0E+13 Ωcm or more.

Further, in one aspect of the liquid crystal display device according to the present invention, at least one of the first alignment film and the second alignment film may be in contact with the transparent layer, and the at least one of the first alignment film and the second alignment film may be formed from polyimide that has polyamic acid ester as a precursor.

Further, in one aspect of the liquid crystal display device according to the present invention, at least one of the first alignment film and the second alignment film may be in contact with the transparent layer, and the at least one of the first alignment film and the second alignment film may contain a photo-reactive group and may be given an ability of aligning liquid crystal molecules when irradiated with ultraviolet rays.

Further, in one aspect of the liquid crystal display device according to the present invention, the transparent layer may have a volume resistivity of 1.0E+9 Ωcm or more and 1.0E+13 Ωcm or less, and the transparent layer may be 20 nm or more and 130 nm or less in thickness.

Further, in one aspect of the liquid crystal display device according to the present invention, further comprising a common electrode formed on the first substrate, the transparent layer may include a first alignment film-side transparent layer, which is in contact with the first alignment film, one of the pixel electrode and the common electrode may be placed on the side near the liquid crystal layer, and the first alignment film-side transparent layer and the one of the pixel electrode and the common electrode may be formed on a common base.

Further, in one aspect of the liquid crystal display device according to the present invention, the first alignment film-side transparent layer may be, when measured with the common base as a reference, thicker than the one of the pixel electrode and the common electrode, and an interface between the first alignment film-side transparent layer and the first alignment film may be formed flatly.

Further, in one aspect of the liquid crystal display device according to the present invention, a combined thickness of the first alignment film and the thickness of the first alignment film-side transparent layer measured with the common base as the reference may be 50 nm or more and 150 nm or less, a thickness of the first alignment film may be 20 nm or more, and a thickness of the first alignment film-side transparent layer measured with the common base as the reference may be 20 nm or more.

Further, in one aspect of the liquid crystal display device according to the present invention, the transparent layer may include a second alignment film-side transparent layer, which is in contact with the second alignment film, and the second alignment film-side transparent layer may have a volume resistivity of 1.0E+9 Ωcm or more and 5.0E+13 Ωcm or less.

Further, in one aspect of the liquid crystal display device according to the present invention, the transparent layer may further include a second alignment film-side transparent layer, which is in contact with the second alignment film, and each of the first alignment film-side transparent layer and the second alignment film-side transparent layer may have a volume resistivity of 1.0E+9 Ωcm or more and 5.0E+13 Ωcm or less.

Further, in one aspect of the liquid crystal display device according to the present invention, a combined volume resistivity of the first alignment film and the first alignment film-side transparent layer in a film thickness direction may be 1.0E+9 Ωcm or more and 1.0E+13 Ωcm or less, and a combined volume resistivity of the second alignment film and the second alignment film-side transparent layer in the film thickness direction may be 1.0E+15 Ωcm or more.

Further, in one aspect of the liquid crystal display device according to the present invention, the transparent layer may contain an alcohol-based solvent as a residual solvent.

According to the present invention, there may be provided a liquid crystal display device of high transmittance in which image sticking of displayed images is inhibited.

DETAILED DESCRIPTION OF THE INVENTION

Liquid crystal display devices according to an embodiment and examples of the present invention are described below in detail with reference to the accompanying drawings. Throughout the drawings, components that have the same functions are denoted by the same reference symbols in order to omit repetitive descriptions from the description of the embodiment and the examples.

Figure 1A:
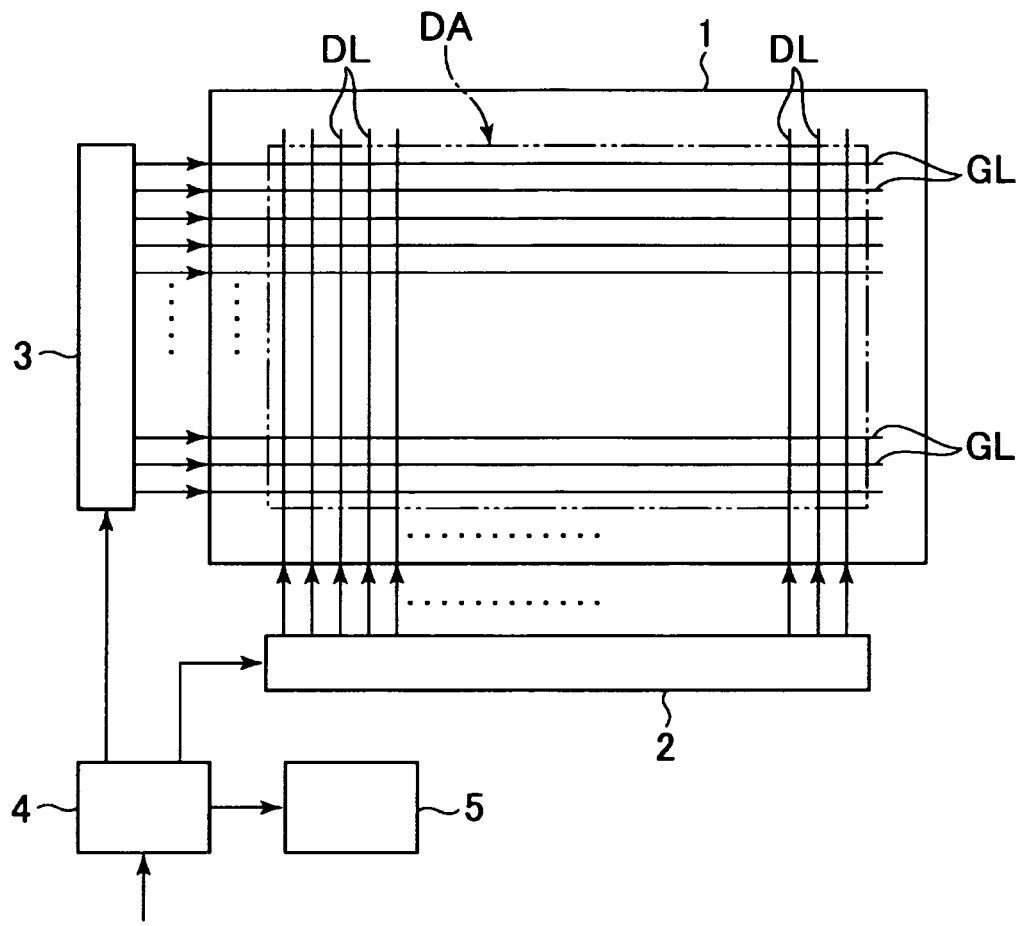
FIG. 1A is a schematic block diagram illustrating the schematic structure of a liquid crystal display device according to an embodiment of the present invention.
Figure 1B:
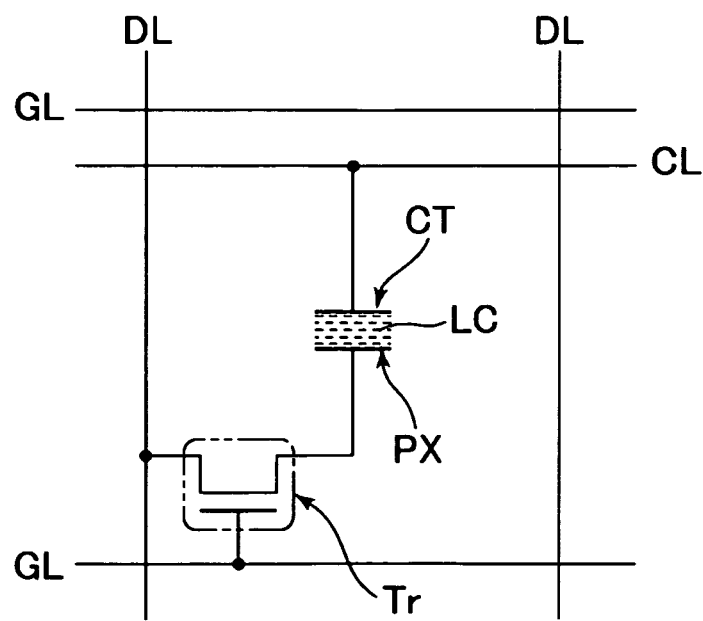
FIG. 1B is a schematic circuit diagram illustrating an example of the circuit structure of a single pixel in a liquid crystal panel according to the embodiment.
Figure 1C:
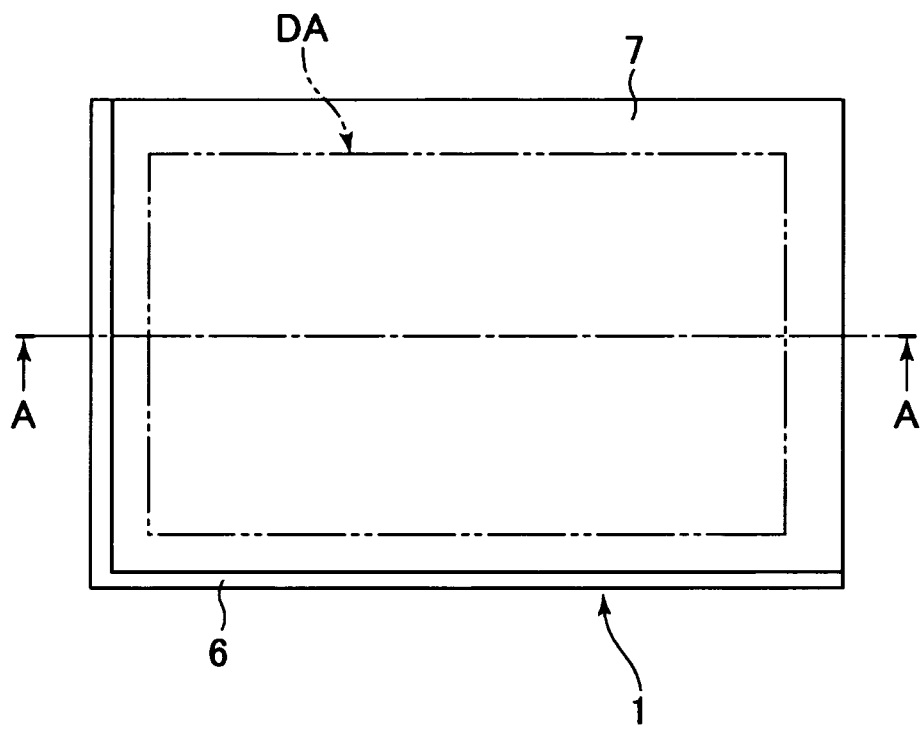
FIG. 1C is a schematic plan view illustrating an example of the schematic structure of the liquid crystal panel according to the embodiment.
Figure 1D:
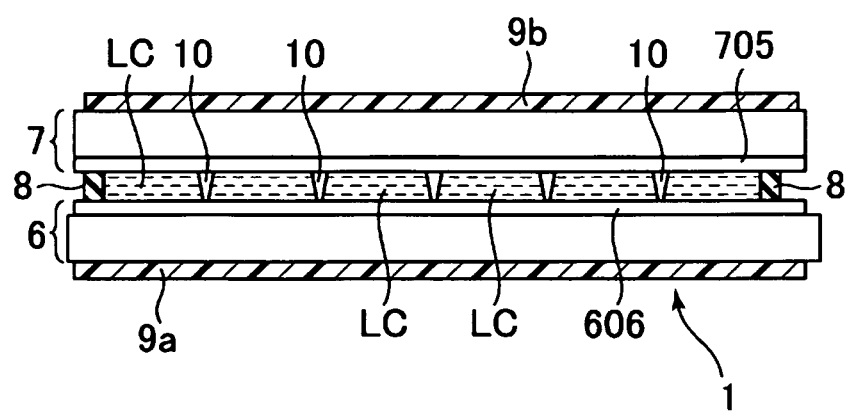
FIG. 1D is a schematic sectional view illustrating a sectional structure cut along the line A-A of FIG. 1C.

FIGS. 1A to 1D are schematic diagrams each illustrating the schematic structure of a liquid crystal display device according to an embodiment of the present invention. FIG. 1A is a schematic block diagram illustrating the schematic structure of the liquid crystal display device according to the embodiment of the present invention. FIG. 1B is a schematic circuit diagram illustrating an example of the circuit structure of a liquid crystal panel. FIG. 1C is a schematic plan view illustrating an example of the schematic structure of the liquid crystal panel. FIG. 1D is a schematic sectional view illustrating a sectional structure cut along the line A-A of FIG. 1C.

The present invention is applied to an active matrix liquid crystal display device, for example. The active matrix liquid crystal display device is used in, for example, a display (monitor) for portable electronic devices, a display for personal computers, a display for printing and designing, a display for medical equipment, and a liquid crystal television set.

The active matrix liquid crystal display device includes, for example, a liquid crystal panel 1, a first driver circuit 2, a second driver circuit 3, a control circuit 4, and a backlight 5 as illustrated in FIG. 1A.

The liquid crystal panel 1 includes a plurality of scanning signal lines (gate lines) GL and a plurality of video signal lines (drain lines) DL. The video signal lines DL are connected to the first driver circuit 2 and the scanning signal lines GL are connected to the second driver circuit 3. FIG. 1A illustrates only some of the plurality of scanning signal lines GL. In the actual liquid crystal panel 1, many more scanning signal lines GL are arranged densely. Similarly, FIG. 1A illustrates only some of the plurality of video signal lines DL, and many more video signal lines DL are arranged densely in the actual liquid crystal panel 1.

A display area DA of the liquid crystal panel 1 according to this embodiment is an aggregation of many pixels. A single pixel occupies an area in the display area DA that corresponds to an area surrounded by two adjacent scanning signal lines GL and two adjacent video signal lines DL. The circuit structure of a single pixel is structured as illustrated in FIG. 1B, and includes a TFT element Tr, which functions as an active element, a pixel electrode PX, a common electrode CT (also called a counter electrode), and a liquid crystal layer LC. The liquid crystal panel 1 in this embodiment is provided with, for example, a common wiring line CL for applying a reference voltage that is common among the common electrodes CT of a plurality of pixels.

The liquid crystal panel 1 is structured, for example, as illustrated in FIGS. 1C and 1D, where a first alignment film 606 and a second alignment film 705 are formed on surfaces of an active matrix substrate (hereinafter referred to as first substrate) 6 and a counter substrate (hereinafter referred to as second substrate) 7, respectively, and the liquid crystal layer LC (a liquid crystal material) is placed between the alignment films. The first substrate 6 and the second substrate 7 are bonded to each other with a ring-like sealing agent 8, which is placed outside the display area DA. The liquid crystal layer LC is tightly sealed in a space surrounded by the first alignment film 606 on the side of the first substrate 6, the second alignment film 705 on the side of the second substrate 7, and the sealing agent 8. The liquid crystal panel 1 of the liquid crystal display device including the backlight 5 also includes a pair of polarizing plates 9a and 9b opposed to each other sandwiching the first substrate 6, the liquid crystal layer LC, and the second substrate 7.

The first substrate 6 is an insulating substrate, such as a glass substrate, on which the scanning signal lines GL, the video signal lines DL, the active elements (TFT elements Tr), the pixel electrodes PX, and other components are disposed. In a case where the liquid crystal panel 1 is driven by an in-plane switching (IPS) method or other lateral field driving method, the common electrodes CT and the common wiring line CL are formed on the first substrate 6. In a case where the liquid crystal panel 1 is driven by twisted nematic (TN) method, vertically alignment (VA) method, or other vertical field driving method, the common electrode CT is formed on the second substrate 7. In a case of the liquid crystal panel 1 driven by the vertical field driving method, the common electrode CT is usually a large sheet of flat electrode shared by all pixels, and the common wiring line CL is not provided.

In the liquid crystal display device according to this embodiment, the space in which the liquid crystal layer LC is tightly sealed is provided with a plurality of column spacers 10 for making the thickness of the liquid crystal layer LC (also referred to as cell gap) uniform in each pixel. The plurality of column spacers 10 are formed on, for example, the second substrate 7.

The first driver circuit 2 is a driver circuit for generating video signals (also referred to as gray scale voltages) to be applied to the pixel electrodes PX of the individual pixels through the video signal lines DL, which is generally called a source driver or a data driver. The second driver circuit 3 is a driver circuit for generating scanning signals to be applied to the scanning signal lines GL, which is generally called a gate driver or a scanning driver. The control circuit 4 is a control circuit for controlling the operation of the first driver circuit 2, the operation of the second driver circuit 3, and the luminance of the backlight 5, which is commonly called a TFT controller or a timing controller. The backlight 5 is a light source such as a fluorescent light (e.g., cold cathode fluorescent light) or a light emitting diode (LED). Light emitted from the backlight 5 is transformed into a planar beam of light through a reflector panel, optical waveguide, light diffuser panel, prism sheet, or the like (not shown), and the beam is cast on the liquid crystal panel 1.

The present invention is centered on the liquid crystal panel 1 out of the components of the active matrix liquid crystal display device structured as above, in particular, the structure of parts of the first substrate 6 and the second substrate 7 that are in contact with the liquid crystal layer LC and the structure of their surroundings. Detailed descriptions on the structures of the first driver circuit 2, the second driver circuit 3, the control circuit 4, and the backlight 5 are therefore omitted.

In liquid crystal display devices, as illustrated in FIG. 1B, a TFT element Tr is turned on when a voltage is applied to the pixel's scanning signal line GL, a voltage applied to the pixel's video signal line DL is applied to the pixel electrode PX via the TFT element Tr, and an electric potential difference between the pixel electrode PX and the common electrode CT is applied to the liquid crystal layer LC as a drive voltage. The voltage applied to the liquid crystal layer LC is retained even after the TFT element Tr is turned off because of the capacitive properties of the liquid crystal layer LC. The voltage applied to the liquid crystal layer LC, which is an alternating current (AC) voltage, is superimposed with a small direct current (DC) voltage when the liquid crystal layer LC is driven in practice. Components of this DC voltage accumulate at the interface between the first alignment film 606 on the side of the first substrate 6 and the liquid crystal layer LC, or at the interface between the second alignment film 705 on the side of the second substrate 7 and the liquid crystal layer LC. The degree of the accumulation of the DC components varies depending on the display gray scale of the liquid crystal display device, which results in image sticking of a displayed image in cases such as when the same image is kept displayed for a longtime. The image sticking becomes more conspicuous as the specific resistance of the alignment film increases, and is very noticeable when the specific resistance of the alignment film exceeds 1.0E+14.

In the liquid crystal display device according to this embodiment, a transparent layer to be described later is formed as a base under at least one of the first alignment film 606 on the side of the first substrate 6 and the second alignment film 705 on the side of the second substrate 7. A transparent layer (first alignment film-side transparent layer) that serves as the base of the first alignment film 606 is formed in a manner that makes the first alignment film-side transparent layer lower in volume resistivity than the first alignment film 606. Similarly, a transparent layer (second alignment film-side transparent layer) that serves as the base of the second alignment film 705 is formed in a manner that makes the second alignment film-side transparent layer lower in volume resistivity than the second alignment film 705. Owing to the transparent layers lower in volume resistivity than the first alignment film 606 and the second alignment film 705, DC charges accumulated at the interface between the liquid crystal layer LC and the first alignment film 606 or the second alignment film 705 are dispersed efficiently and image sticking is inhibited. The first alignment film-side transparent layer and the second alignment film-side transparent layer each have a thickness equal to or larger than 20 nm and equal to or smaller than 130 nm to disperse the DC charges and inhibit image sticking.

In the liquid crystal display device according to this embodiment, the first alignment film-side transparent layer or the second alignment film-side transparent layer is formed by a wet process from an inorganic material such as polysiloxane, or from an organic resin material such as polyisothianaphthene, poly-3,4-ethylenedioxythiophene, or polypyrrole. Forming the transparent layer by a wet process improves the adhesion with the first alignment film 606 or the second alignment film 705 which is, in general, similarly formed by a wet process. In the case where the transparent layer is formed to be in contact with the comb tooth-shaped pixel electrode PX and the common electrode CT, too, using a wet process to form the transparent layer creates a smaller gap during the formation of the film than when a dry process is used, and improves the adhesion with these electrodes. The improved adhesion with the alignment film and with the electrodes means that electric charges that cause image sticking are freed more easily than when the transparent layer is formed from silicon nitride or other similar materials by a dry process.

Forming the transparent layer by a wet process to be thicker than the pixel electrode PX and the common electrode CT, the interface between the transparent layer and the alignment film is formed flatly. This way, the intensity of an electric field applied around the edges of the pixel electrode PX and the common electrode CT is lessened, and the risk of image sticking is reduced further. Forming the transparent layer flat also makes the alignment film flat and improves the controllability of the liquid crystal layer LC.

For instance, when it is the first alignment film-side transparent layer that is formed, electric charges that cause image sticking travel through the transparent layer in an in-plane direction or a depth direction, arrive at one of the pixel electrode PX and the common electrode CT that is on the side of the liquid crystal layer LC from the first alignment film 606, and are freed at that point. It is therefore desirable to set the volume resistivity and thickness of the transparent layer formed as a base under at least one of the first alignment film 606 and the second alignment film 705 such that image sticking characteristics are improved. Desirably, the combined thickness of the first alignment film 606 or the second alignment film 705 and the transparent layer serving as the base of the alignment film is set to 50 nm or more and 150 nm or less, the alignment film and the transparent layer each have a thickness of at least 20 nm, and the combined volume resistivity of the alignment film and the transparent layer in the film thickness direction is 1.0E+9 Ωcm or more and 1.0E+14 Ωcm or less. If the combined thickness of the first alignment film 606 and its base transparent layer is 150 nm or thicker, an electric field applied to the liquid crystal layer is weakened, which is undesirable. If the transparent layer is formed from a material whose volume resistivity is lower than 1.0E+9 Ωcm, it makes retaining an applied voltage difficult.

In this embodiment, the transparent layer formed as the base of the first alignment film 606 or the second alignment film 705 is made of polysiloxane, or made of an organic resin material such as polyisothianaphthene, poly-3,4-ethylenedioxythiophene, or polypyrrole. The volume resistivity of the transparent layer is desirably 1.0E+9 Ωcm to 1.0E+13 Ωcm, more desirably, 1.0E+9 Ωcm to 1.0E+12 Ωcm. Polysiloxyane contains a molecular structure expressed by the following general formula [Chemical Formula 3]:

[Chemical Formula 3]

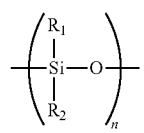

In Chemical Formula 3, R1 and R2 each represent an alkyl group or alkoxy group having 1 to 3 carbon atoms, or a hydroxyl group. The volume resistivity of polysiloxyane may be controlled by controlling the number of hydroxyl groups in the general formula [Chemical Formula 3], and a lower volume resistivity is obtained by increasing the number of hydroxyl groups. Polysiloxane is therefore preferred as the material of the transparent layer serving as the base of the first alignment film 606 or the second alignment film 705.

The transparent layer is formed from one of the materials given above by a wet process in which the material in a solution state is printed and then heated to evaporate the solvent, and is therefore lower in cost than one formed by a dry process. The solvent used in this process is, for example, ethanol and contained as a residual solvent in the transparent layer serving as the base of at least one of the first alignment film 606 and the second alignment film 705.

The transparent layer in this embodiment may contain Si-based fine particles or metal fine particles. Adding fine particles to the transparent layer lowers the specific resistance of the transparent layer. The diameter of fine particles added to the transparent layer is desirably 30 nm or less, more desirably, 20 nm or less, or 10 nm or less, i.e., smaller the better. Fine particles having a smaller diameter are preferred because electric charges are dispersed in the transparent layer more easily and the lowering of transmittance is consequently avoided.

When the liquid crystal layer LC of the liquid crystal display device according to this embodiment has a volume resistivity higher than 1.0E+13 Ωcm, it is difficult for the liquid crystal layer LC to remedy the accumulation of electric charges at the interface between one of the alignment films and the liquid crystal layer LC, and the risk of image sticking rises as a result. When the volume resistivity of the liquid crystal layer LC is higher than 5.0E+13 Ωcm or 1.0E+14 Ωcm, the risk of image sticking is even greater. In these cases, providing a transparent layer as the base of the alignment film which is in contact with the liquid crystal layer LC is an effective way to disperse electric charges accumulated at the interface between the alignment film and the liquid crystal layer LC.

When one of the alignment films according to this embodiment has a volume resistivity higher than 1.0E+14 Ωcm or 1.0E+15 Ωcm, many electric charges accumulate at the interface between the alignment film and the liquid crystal layer LC and the risk of image sticking accordingly rises. In this case, too, providing a transparent layer as the base of the alignment film which is in contact with the liquid crystal layer LC is an effective way to disperse electric charges accumulated at the interface between the alignment film and the liquid crystal layer LC. An alignment film that is made of polyimide having polyamic acid ester as a precursor has a high volume resistivity and increases the risk of image sticking. An alignment film that obtains the ability of aligning liquid crystal molecules when irradiated with ultraviolet rays also has a high volume resistivity because impurities to act as carriers are removed by the cleansing effect of ultraviolet rays, with the result that the risk of image sticking rises consequently.

The transmittance, Y value, of the transparent layer in this embodiment is desirably 99.0% or higher, more desirably, 99.5% or higher. A transparent layer having a higher transmittance Y value improves the luminance of the liquid crystal display device more. The Y value is a transmittance (%) calculated from the transmission spectrum of the transparent layer according to the JIS standard Z-8722.

EXAMPLE 1

Figure 2A:
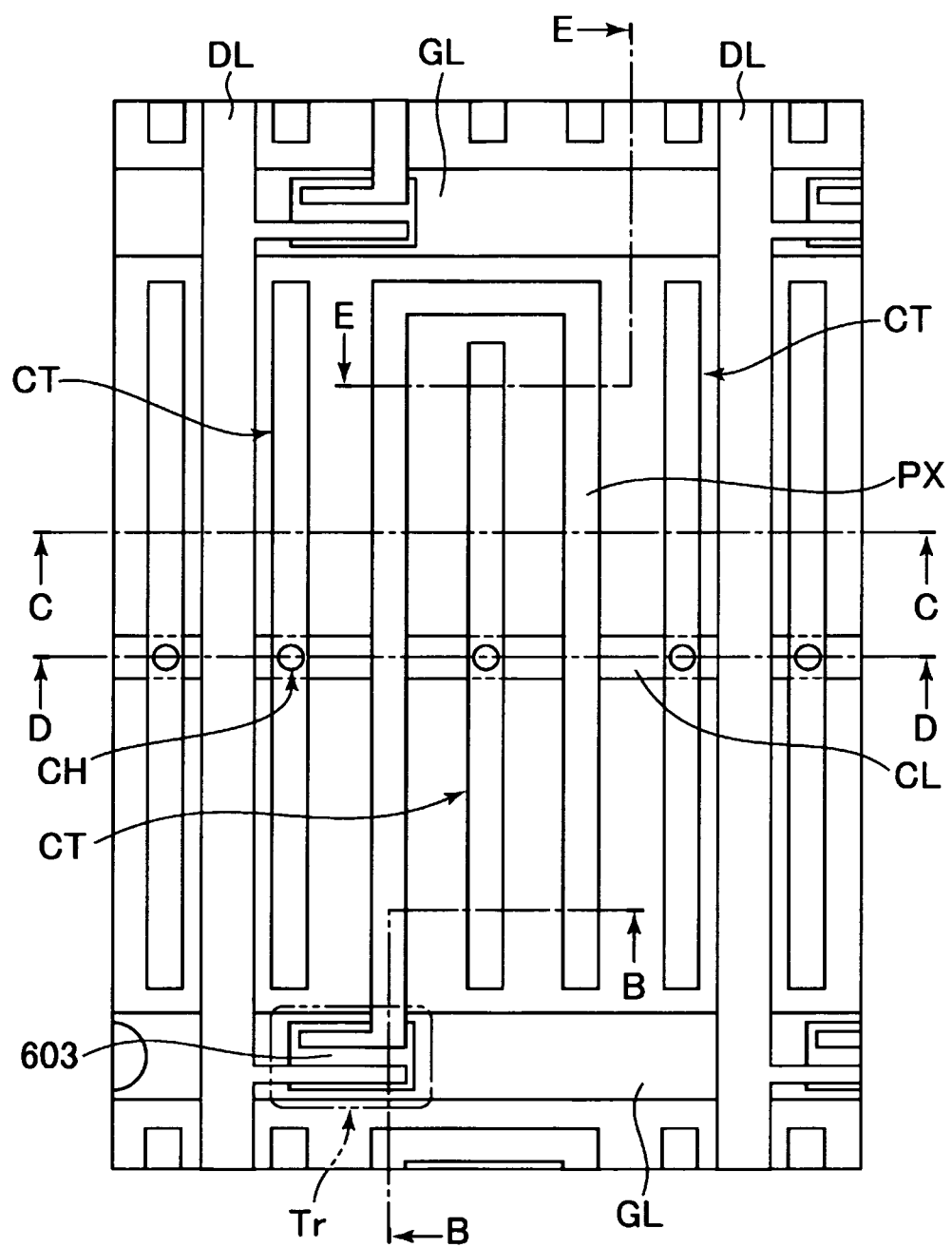
FIG. 2A is a schematic plan view illustrating the planar structure of a single pixel of an active matrix substrate in a liquid crystal panel according to Example 1 of the present invention.
Figure 2B:
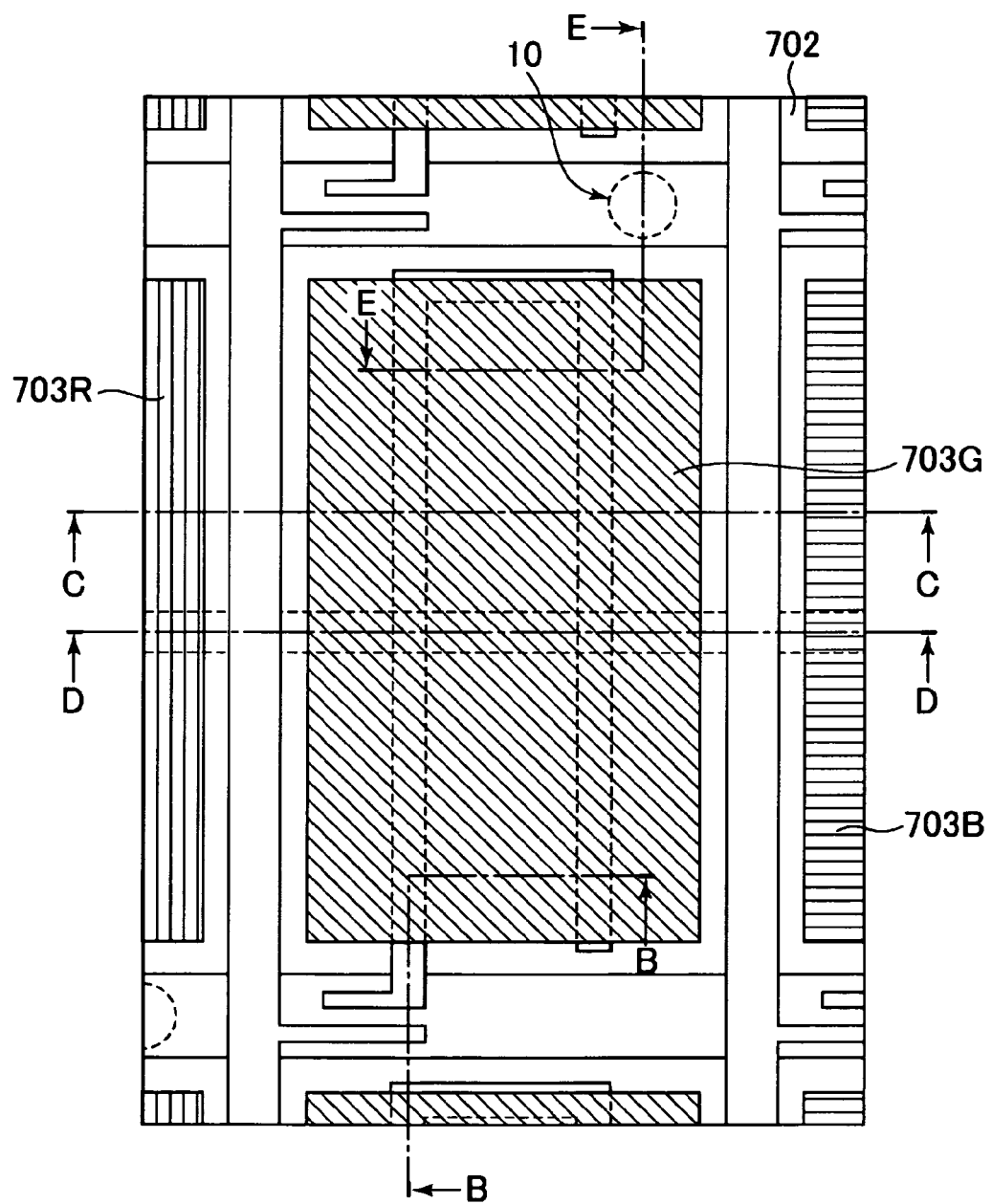
FIG. 2B is a schematic plan view illustrating the planar structure of the pixel in which a counter substrate is laid on top of the area shown in FIG. 2A.
Figure 2C:
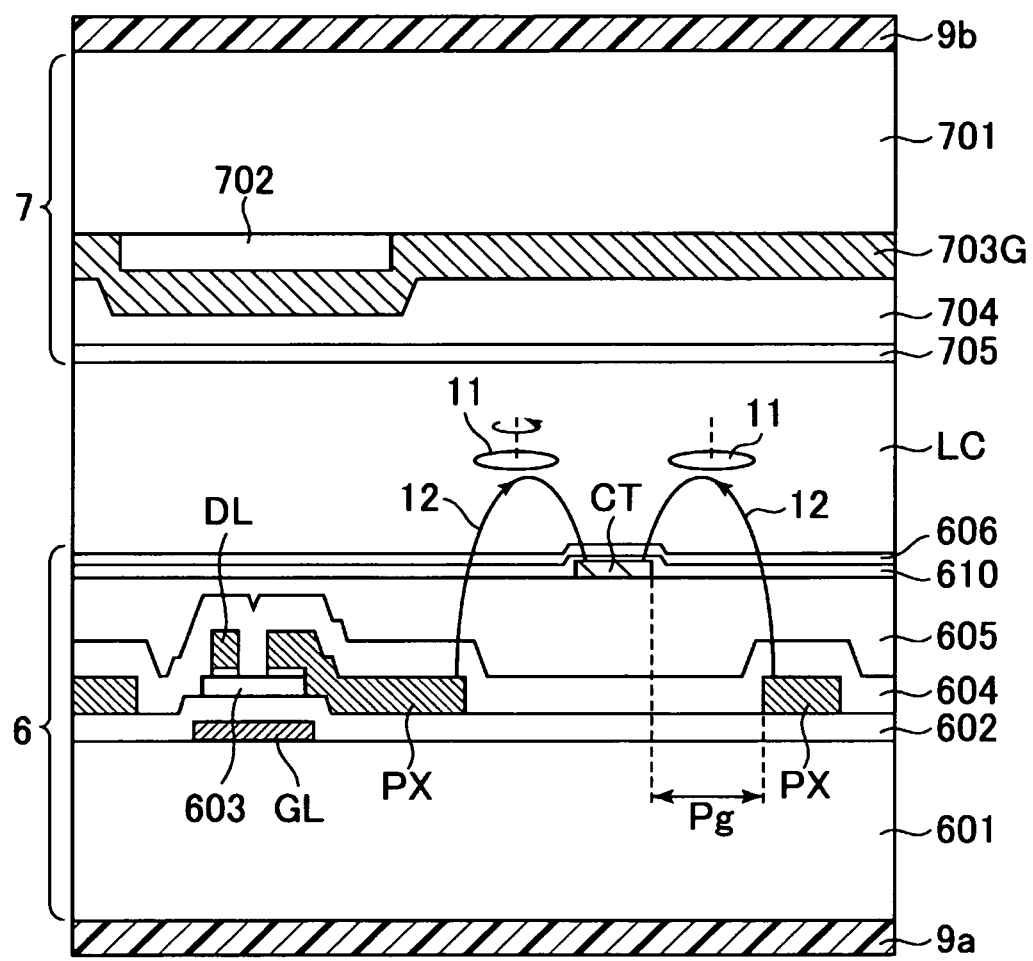
FIG. 2C is a schematic sectional view illustrating a sectional structure cut along the lines B-B of FIGS. 2A and 2B.
Figure 2D:
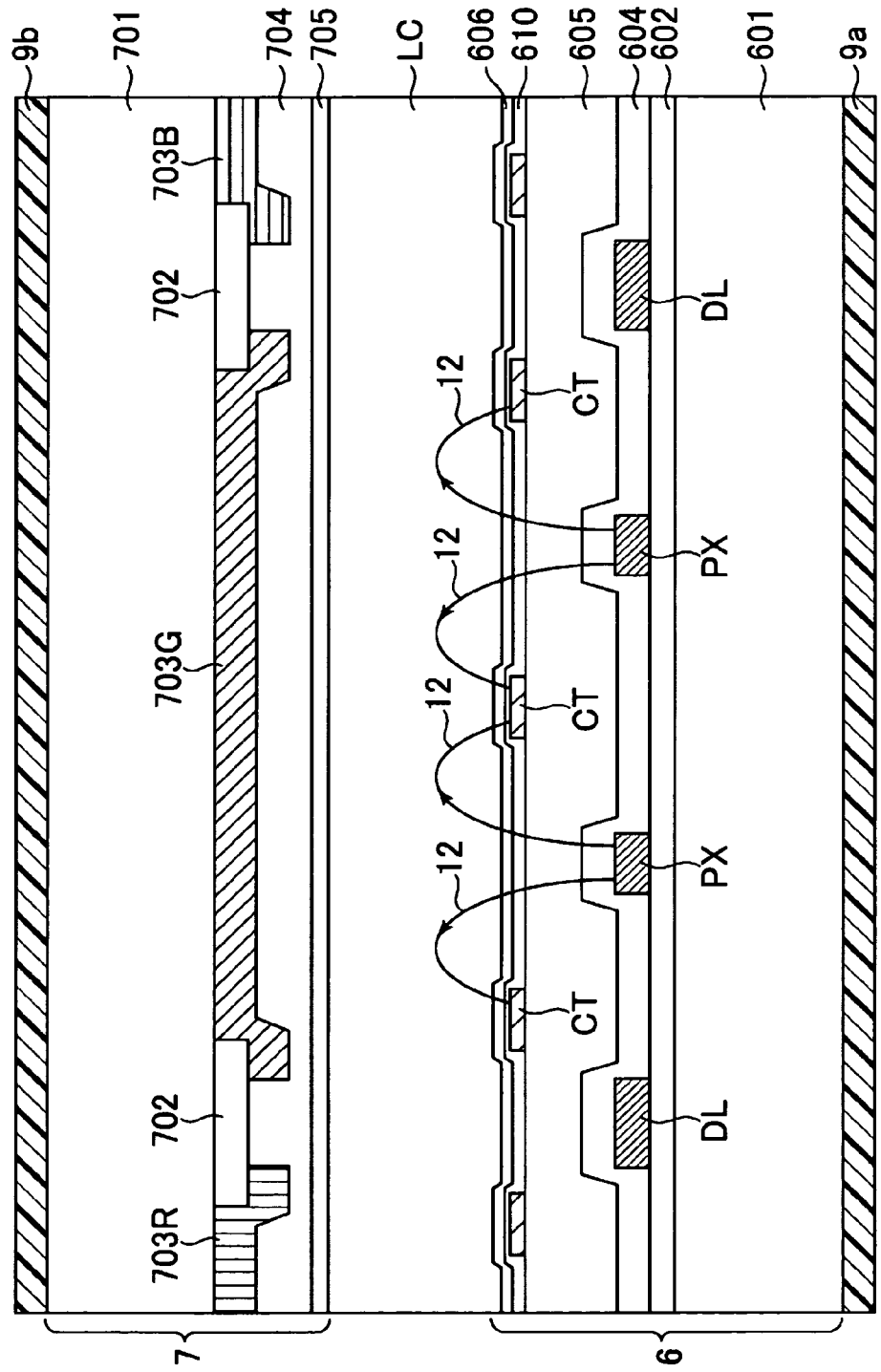
FIG. 2D is a schematic sectional view illustrating a sectional structure cut along the lines C-C of FIGS. 2A and 2B.
Figure 2E:
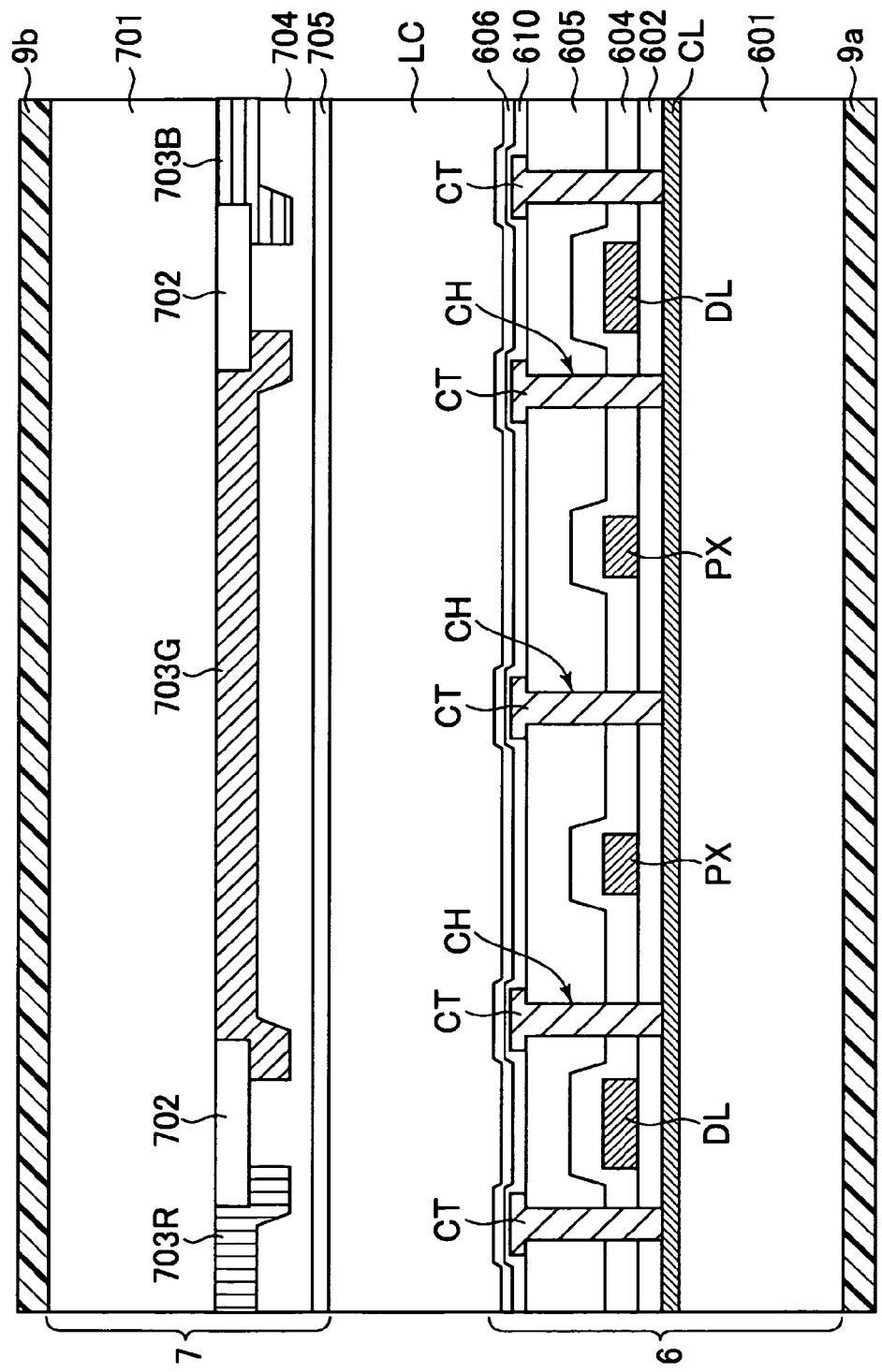
FIG. 2E is a schematic sectional view illustrating a sectional structure cut along the lines D-D of FIGS. 2A and 2B.
Figure 2F:
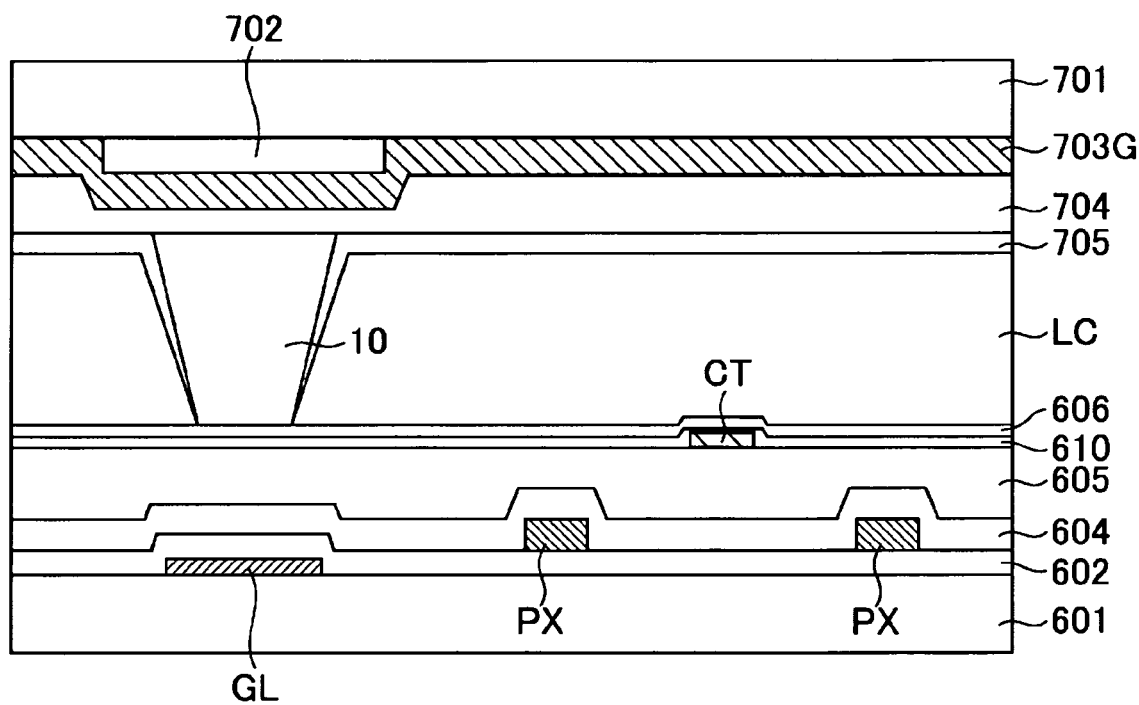
FIG. 2F is a schematic sectional view illustrating a sectional structure cut along the lines E-E of FIGS. 2A and 2B.

FIGS. 2A to 2F are schematic diagrams illustrating the schematic structure of an in-plane switching (IPS) liquid crystal panel according to Example 1 of the present invention. FIG. 2A is a schematic plan view illustrating the planar structure of a single pixel of an active matrix substrate (first substrate) 6 in the liquid crystal panel of Example 1. FIG. 2B is a schematic plan view illustrating the planar structure of the pixel in which a counter substrate (second substrate) is laid on top of an area illustrated in FIG. 2A. FIG. 2C is a schematic sectional view illustrating a sectional structure cut along the lines B-B of FIGS. 2A and 2B. FIG. 2D is a schematic sectional view illustrating an example of a sectional structure cut along the lines C-C of FIGS. 2A and 2B. FIG. 2E is a schematic sectional view illustrating a sectional structure cut along the lines D-D of FIGS. 2A and 2B. FIG. 2F is a schematic sectional view illustrating a sectional structure cut along the lines E-E of FIGS. 2A and 2B.

The lines B-B, C-C, D-D, and E-E in FIG. 2A are respectively projections of the lines B-B, C-C, D-D, and E-E in FIG. 2B on the first substrate 6, and FIGS. 2C to 2F illustrate sectional structures with the second substrate 7 laid on top of the first substrate 6. FIG. 2F illustrates a partial sectional structure which shows only the liquid crystal layer LC plus the first substrate 6 and the second substrate 7 in the vicinity of the liquid crystal layer LC.

Example 1 takes an IPS liquid crystal panel, which is a lateral field driving liquid crystal panel, as an example of the liquid crystal panel 1 to which the present invention is applied. A single pixel and its peripheries in the liquid crystal panel 1 of Example 1 are structured as illustrated in FIGS. 2A to 2F.

The first substrate 6 is an insulating substrate such as a glass substrate 601 on a surface of which the scanning signal lines GL, the common wiring line CL, and a first insulating layer 602 are formed, with the first insulating layer 602 covering the scanning signal lines GL and the common wiring line CL. Formed on the first insulating layer 602 are a semiconductor layer 603 of the TFT element Tr, the video signal lines DL, and the pixel electrode PX, which are covered with a second insulating layer 604. The semiconductor layer 603 is formed above one scanning signal line GL, and a part of the scanning signal line GL that is below the semiconductor layer 603 functions as a gate electrode of the TFT element Tr. The semiconductor layer 603 includes, for example, an active layer (channel forming layer) formed of first amorphous silicon, and a source diffusion layer and a drain diffusion layer, which are formed of second amorphous silicon to be laminated on the active layer. The second amorphous silicon differs from the first amorphous silicon in impurity type and impurity concentration. One video signal line DL and the pixel electrode PX partially rest on the semiconductor layer 603, and the parts resting on the semiconductor layer 603 function as a drain electrode and a source electrode of the TFT element Tr.

The source and the drain of the TFT element Tr are switched in accordance with a bias relation, namely, a high-low relation between the electric potential of the pixel electrode PX and the electric potential of the video signal line DL when the TFT element Tr is turned on. In the following description, however, an electrode connected to the video signal line DL is referred to as drain electrode and an electrode connected to the pixel electrode PX is referred to as source electrode.

On the second insulating layer 604, a third insulating layer 605 (overcoat layer) having a leveled surface is formed as the base of the common electrode CT. On the third insulating layer 605, the common electrode CT and a transparent layer (first alignment film-side transparent layer) 610, which covers the common electrode CT and the third insulating layer 605, are formed. The first alignment film 606 is formed on the first alignment film-side transparent layer 610. The common electrode CT and the first alignment film-side transparent layer 610 are both formed with the third insulating layer 605 as a base, and a part of the third insulating layer 605 that is not covered with the common electrode CT is in contact with the first alignment film-side transparent layer 610. The common electrode CT is connected to the common wiring line CL via a contact hole CH (through hole), which passes through the first insulating layer 602, the second insulating layer 604, and the third insulating layer 605. The common electrode CT is formed, for example, such that a gap Pg from the pixel electrode PX in the plan view of FIG. 2A is approximately 7 μm.

In this example, the first alignment film-side transparent layer 610 is formed from a polysiloxane-based material (also simply referred to as polysiloxane), but may instead be formed from a transparent organic resin material (such as polyisothianaphthene, poly-3,4-ethylenedioxythiophene, or polypyrrole). The first alignment film 606 is formed from polyimide resin obtained by heating polyamic acid, and has a surface subjected to rubbing treatment for giving the first alignment film 606 the ability of aligning liquid crystal molecules.

Polysiloxane used for the first alignment film-side transparent layer 610 in this example is obtained by dissolving a silane-based monomer in alcohol such as ethanol as a solvent, and printing and drying the resultant solution to hydrolyze and polymerize the silane-based monomer. Alternatively, the first alignment film-side transparent layer 610 may be formed from an organic resin material obtained by printing and drying varnish. In order to conduct electric charges accumulated at the interface between the liquid crystal layer LC and the first alignment film 606 which cause image sticking of a displayed image to the pixel electrode PX, the volume resistivity (or simply specific resistance) of the first alignment film-side transparent layer 610 is set lower than that of the first alignment film 606. The specific resistance of the first alignment film 606 which is made of polyimide-based resin is usually $1.0E+14$ ($\Omega$cm) or more. It is therefore desirable to set the specific resistance of the first alignment film-side transparent layer 610 to a value lower than $5.0E+13$ ($\Omega$cm) in order to conduct electric charges more efficiently and obtain a high-quality liquid crystal display device that does not allow image sticking of a displayed image. The specific resistance of the first alignment film-side transparent layer 610 is also desirably set to a value higher than $1.0E+9$ ($\Omega$cm) in order to prevent a short circuit between one common electrode CT and another common electrode CT.

The molecular structure of polysiloxane that forms the first alignment film-side transparent layer 610 in this example is as shown in Chemical Formula 3, where R1 and R2 each represent an alkyl group or alkoxy group having 1 to 3 carbon atoms, or a hydroxyl group. The specific resistance of the first alignment film-side transparent layer 610 may therefore be controlled by controlling the number of hydroxyl groups in polysiloxane, and a lower specific resistance may be obtained by increasing the number of hydroxyl groups.

The second substrate 7 is an insulating substrate such as a glass substrate 701 on a surface of which a black matrix 702, color filters 703R, 703G, and 703B, and an overcoat layer 704 are formed, with the overcoat layer 704 covering the black matrix 702 and the color filters 703R, 703G, and 703B. The black matrix 702 is, for example, a grid-patterned light-shielding film for providing the display area DA with opening regions on a pixel basis. The color filters 703R, 703G, and 703B are each a film for transmitting only light of a specific wavelength range (color) out of white light from the backlight 5, for example, and, when the liquid crystal display device is capable of displaying RGB color the color filters 703R, 703G, and 703B transmitting red light, green light, and blue light are arranged, respectively. The overcoat layer 704 levels the surface of the second substrate 7 on which the color filters 703 and the black matrix 702 are formed.

The plurality of column spacers 10 and a second alignment film 705 are formed on the overcoat layer 704. The plurality of column spacers 10 have, for example, a conical frustum shape with a flat top (also referred to as body of rotation obtained by rotating a trapezoid). Each column spacer 10 is formed in a place overlapping with a part of one scanning signal line GL on the first substrate 6 that is not a part where the TFT element Tr is disposed nor a part where the scanning signal line GL intersects the video signal line DL. The second alignment film 705 is formed from, for example, a polyimide-based resin, and has a surface on which rubbing has been performed.

Liquid crystal molecules 11 of the liquid crystal layer LC in the liquid crystal panel 1 of Example 1 are aligned to be substantially parallel to the surfaces of the glass substrates 601 and 701 during no-electric field application in which the pixel electrode PX and the common electrode CT have an equal electric potential, and are homogeneously aligned in an initial alignment direction which is determined by the rubbing performed on the first alignment film 606 and the second alignment film 705.

When the TFT element Tr is turned on to write a gray scale voltage applied to the video signal line DL in the pixel electrode PX and an electric potential difference is generated between the pixel electrode PX and the common electrode CT as a result, an electric field 12 (electric flux lines) as illustrated in FIGS. 2C and 2D is generated and applied to the liquid crystal molecules 11. The intensity of the applied electric field 12 is dependent on the electric potential difference between the pixel electrode PX and the common electrode CT. Upon application, an interaction between the dielectric anisotropy of the liquid crystal layer LC and the electric field 12 changes the orientation of the liquid crystal molecules 11 constituting the liquid crystal layer LC in the direction of the electric field 12, thereby changing the refractive anisotropy of the liquid crystal layer LC. The orientation of the liquid crystal molecules 11 is determined by the intensity of the electric field 12 applied (the magnitude of the electric potential difference between the pixel electrode PX and the common electrode CT). The liquid crystal display device may therefore display a video or an image by, for example, performing a pixel-based control of the gray scale voltage to be applied to the pixel electrode PX and thus changing the light transmittance in individual pixels while fixing the electric potential of the common electrode CT.

An example of a method of manufacturing the liquid crystal panel 1 according to Example 1 is described below. The method of manufacturing the liquid crystal panel 1 of Example 1 includes some steps which may be executed by the same procedure as in a conventional liquid crystal panel manufacturing method, and a detailed description of those steps is omitted.

The method of manufacturing the liquid crystal panel 1 of Example 1 roughly includes three steps: a step of forming the first substrate 6; a step of forming the second substrate 7; and a step of bonding the first substrate 6 and the second substrate 7 together to enclose a liquid crystal material (liquid crystal layer LC).

The step of forming the first substrate 6 uses the glass substrate 601 with a polished surface which has a thickness of 0.7 mm, for example. First, the scanning signal lines GL and the common wiring line CL are formed on the surface of the glass substrate 601. The scanning signal lines GL and the common wiring line CL are formed by, for example, forming a metal film such as a chromium film (Cr film) on the entire surface of the glass substrate 601 and etching the metal film.

Next, the first insulating layer 602 is formed. The first insulating layer 602 is formed by, for example, forming a silicon nitride film having a thickness of about 0.3 μm on the entire surface of the glass substrate 601.

An insular semiconductor film is formed next to be used as the semiconductor layer 603 of the TFT element Tr. The insular semiconductor film is formed by, for example, forming an amorphous silicon film on the entire surface of the first insulating layer 602 and etching the amorphous silicon film. The amorphous silicon film has, for example, a laminated structure in which a first amorphous silicon layer is topped with a second amorphous silicon layer different from the first amorphous silicon layer in conductivity type or in impurity type or impurity concentration. Other layers including a short-circuit preventing layer, which is interposed between one scanning signal line GL and one video signal line DL in an area where the signal lines GL and DL intersect each other, are formed at the same time when the insular semiconductor film is formed.

The video signal lines DL and the pixel electrode PX are formed next. The video signal lines DL and the pixel electrode PX are formed by, for example, forming a metal film such as a chromium film on the first insulating layer 602 and etching the metal film. The etching is performed so as to shape the video signal lines DL such that a portion of each video signal line DL rests on the insular semiconductor film, in other words, a portion of each video signal line DL functions as the drain electrode of the TFT element Tr. The etching is also performed so as to shape the pixel electrode PX such that a portion of the pixel electrode PX rests on the insular semiconductor film, in other words, a portion of the pixel electrode PX functions as the source electrode of the TFT element Tr.

Next, with the video signal lines DL and the pixel electrode PX as a mask, the second amorphous silicon layer of the insular semiconductor film is etched to be divided into a drain diffusion layer and a source diffusion layer. The semiconductor layer 603 of the TFT element Tr is thus obtained.

The second insulating layer 604 and the third insulating layer 605 are formed next. The second insulating layer 604 is formed of, for example, a silicon nitride film that is approximately 0.3 μm in thickness. The third insulating layer 605 is formed by, for example, applying an uncured acrylic-based resin and then curing the resin under given conditions such as heating at a temperature of 220° C. for an hour. Alternatively, the third insulating layer 605 may be formed, for example, of a heat-curable resin that has excellent insulative properties and transparency, such as epoxy acrylic-based resin or polyimide-based resin. Still alternatively, the third insulating layer 605 may be formed of a photo-curable transparent resin.

Next, the contact hole CH passing through the first insulating layer 602, the second insulating layer 604, and the third insulating layer 605 is formed above a given area of the common wiring line CL. The contact hole CH is formed by etching the first insulating layer 602, the second insulating layer 604, and the third insulating layer 605.

The common electrode CT is formed next. The common electrode CT is formed by, for example, forming a transparent conductive film such as an indium tin oxide (ITO) film on the third insulating layer 605 to a thickness of about 50 nm and etching the transparent conductive film.

The first alignment film-side transparent layer 610 is formed next. The first alignment film-side transparent layer 610 in this example used a polysiloxane-based material that had a molecular structure expressed by Chemical Formula 3, and was formed to a thickness of 60 nm by dissolving the material in ethanol as a solvent, printing the resultant solution (4 wt %) on the third insulating layer 605 and the common electrode CT, leveling at 80° C. for approximately two minutes, and heating at 150° C. for ten minutes. The ethanol-based solvent may be allowed to remain in the formed first alignment film-side transparent layer 610 because the residual solvent has an effect of lowering the specific resistance.

In this example, three different polysiloxane-based materials A, B, and C, were prepared by varying the compositions of R1 and R2 to fabricate three types of liquid crystal panel 1. R1 and R2 each represent an ethoxy group ($-OCH_2CH_3$) or a hydroxyl group ($-OH$). The composition ratio of R1 and R2 was 7:3 in the polysiloxane-based material A, 5:5 in the material B, and 3:7 in the material C. The specific resistance was 1.0E+13 Ωcm in the polysiloxane-based material A, 1.0E+11 Ωcm in the material B, and 1.0E+9 Ωcm in the material C. The transmittance Y value was 99.5% in all of the materials A, B, and C.

While R1 and R2 were an ethoxy group and a hydroxyl group in this example, it was confirmed that the same effect was obtained when the ethoxy group was replaced by a methyl group, an ethyl group, a propyl group, a methoxy group, or a propoxy group, and that a lower specific resistance was obtained when the hydroxyl group was introduced at a higher ratio.

The first alignment film 606 is formed next. The first alignment film 606 is formed by, for example, dissolving polyimide resin, or a precursor of polyimide resin such as polyamic acid or polyamic acid ester, in a given solvent, applying the resultant solution (alignment film varnish), vaporizing the solvent through heating that is executed under given conditions to promote imidization reaction, and then performing rubbing treatment.

The inventors of the present invention formed the first alignment film 606 by preparing alignment film varnish in which polyamic acid, N-methyl-2-pyrrolidone (NMP), γ-butyrolactone (GBL), and butyl cellosolve (BC) were mixed at a weight ratio of 6:20:54:20, applying the alignment film varnish through flexography, drying at 70° C., and subsequently heating at 220° C. for thirty minutes. The obtained first alignment film 606 had a thickness of approximately 60 nm in a part that was formed on the first alignment film-side transparent layer 610. The specific resistance of polyimide that was used in this example and had polyamic acid as a precursor was 1.0E+14 Ωcm.

The counter substrate 7 of the liquid crystal panel 1 of Example 1 can be formed by a conventional procedure and a description on the procedure is omitted. The inventors of the present invention formed the column spacers 10 that are approximately 4.2 μm tall on the overcoat layer 704, and then formed the second alignment film 705 on the second substrate 7 by the same procedure as the one used for the first alignment film 606 on the first substrate 6. The thickness of the second alignment film 705 was approximately 100 nm in an opening area (an area above a color filter).

The step of bonding together the first substrate 6 and the second substrate 7 which have been formed by the procedure described above to enclose a liquid crystal material includes, for example, forming the ring-like sealing agent 8 by application in the perimeter of the display area DA of the counter substrate 7, dripping the liquid crystal material in an area that is surrounded by the sealing agent 8, and bonding the first substrate 6 to the second substrate 7. The substrates are bonded such that the initial alignment direction of the first alignment film 606 on the first substrate 6 and the initial alignment direction of the second alignment film 705 on the second substrate 7 are substantially parallel to each other. The liquid crystal material used here is a nematic liquid crystal composition A, which has, for example, a positive dielectric anisotropy $\Delta\in$ at a value of 10.2 (1 kHz, 20° C.), a refractive anisotropy $\Delta n$ of 0.075 (wavelength: 590 nm, 20° C.), a twist elastic constant K2 of 7.0 pN, a nematic-isotropic phase transition temperature T (N-I) of about 76° C., and a specific resistance of 1.0E+13 Ωcm. The first substrate 6 and the second substrate 7 are bonded with the thickness of the liquid crystal layer LC (cell gap) set to a value that is substantially the same as the height of the column spacers 10, for example, 4.2 μm.

The retardation (Δn·d) of the liquid crystal panel 1 manufactured by the procedure described above is approximately 0.31 μm. The retardation Δn·d desirably satisfies 0.2 μm≦Δn·d≦0.5 μm, and a retardation value outside this range causes such problems as the presence of unintended colors in an image that is to be displayed in white.

A procedure subsequent to the sealing of the liquid crystal material between the bonded first substrate 6 and second substrate 7 is, for example, cutting off an unnecessary portion (margin) along the perimeter of the glass substrates 601 and 701 and bonding the polarizing plates 9a and 9b together. In bonding the polarizing plates 9a and 9b, the polarization transmission axis of one of the polarizing plates is set substantially parallel to the initial alignment direction of the first alignment film 606 on the first substrate 6 and the initial alignment direction of the second alignment film 705 on the second substrate 7, and the polarization transmission axis of the other polarizing plate is set orthogonal to that of the one polarizing plate. Thereafter, the first driver circuit 2, the second driver circuit 3, the control circuit 4, the backlight 5, and other components are connected to operate as modules, at which point a liquid crystal display device including the liquid crystal panel 1 of Example 1 is obtained. The liquid crystal panel 1 of Example 1 has normally-closed characteristics which cause the liquid crystal panel 1 to display a dark screen (to display at a low luminance) when the electric potential difference between the pixel electrode PX and the common electrode CT is small, and to display a bright screen (to display at a high luminance) when the electric potential difference between the pixel electrode PX and the common electrode CT is large.

The inventors of the present invention tested three liquid crystal display devices including the three types of liquid crystal panel 1 of Example 1 for image sticking of a displayed image. In the image sticking test, a monochrome window pattern is displayed for eight hours on each liquid crystal display device, gradation display is subsequently executed by setting the entire screen to a gray level, and how long it takes for the window pattern (also referred to as image sticking or residual image) to fade is measured. A satisfactory image sticking fading time is thirty minutes or less. The image sticking fading time of the liquid crystal display device including the liquid crystal panel 1 according to this example was twelve minutes in the case of the liquid crystal panel 1 using the polysiloxane-based material A whose specific resistance was 1.0E+13 Ωm, six minutes in the case of the liquid crystal panel 1 using the polysiloxane-based material B whose specific resistance was 1.0E+11 Ωm, and two minutes in the case of the liquid crystal panel 1 using the polysiloxane-based material C whose specific resistance was 1.0E+9 Ωm. It was thus confirmed that the tested liquid crystal display devices all had fine image sticking characteristics.

The liquid crystal display device including the liquid crystal panel 1 of Example 1 was also measured for transmittance and luminance. It was confirmed as a result that every measured liquid crystal display device had as fine characteristics as those of conventional liquid crystal display devices in terms of both transmittance and luminance.

Example 1 takes as an example the lateral field driving liquid crystal panel 1 that has pixels structured as illustrated in FIGS. 2A to 2F. However, the pixel structure (e.g., the shapes of the TFT element Tr, the pixel electrode PX, and the common electrode CT in plan view (planar layout)) is not limited to the one illustrated in FIGS. 2A to 2F and may be modified to suit individual purposes.

The TFT element Tr of FIGS. 2A and 2C has a bottom gate structure in which the semiconductor layer 603 is placed above the scanning signal lines GL, but may instead have a top gate structure in which the semiconductor layer 603 is placed between the glass substrate 601 and the scanning signal lines GL.

EXAMPLE 2

Figure 3A:
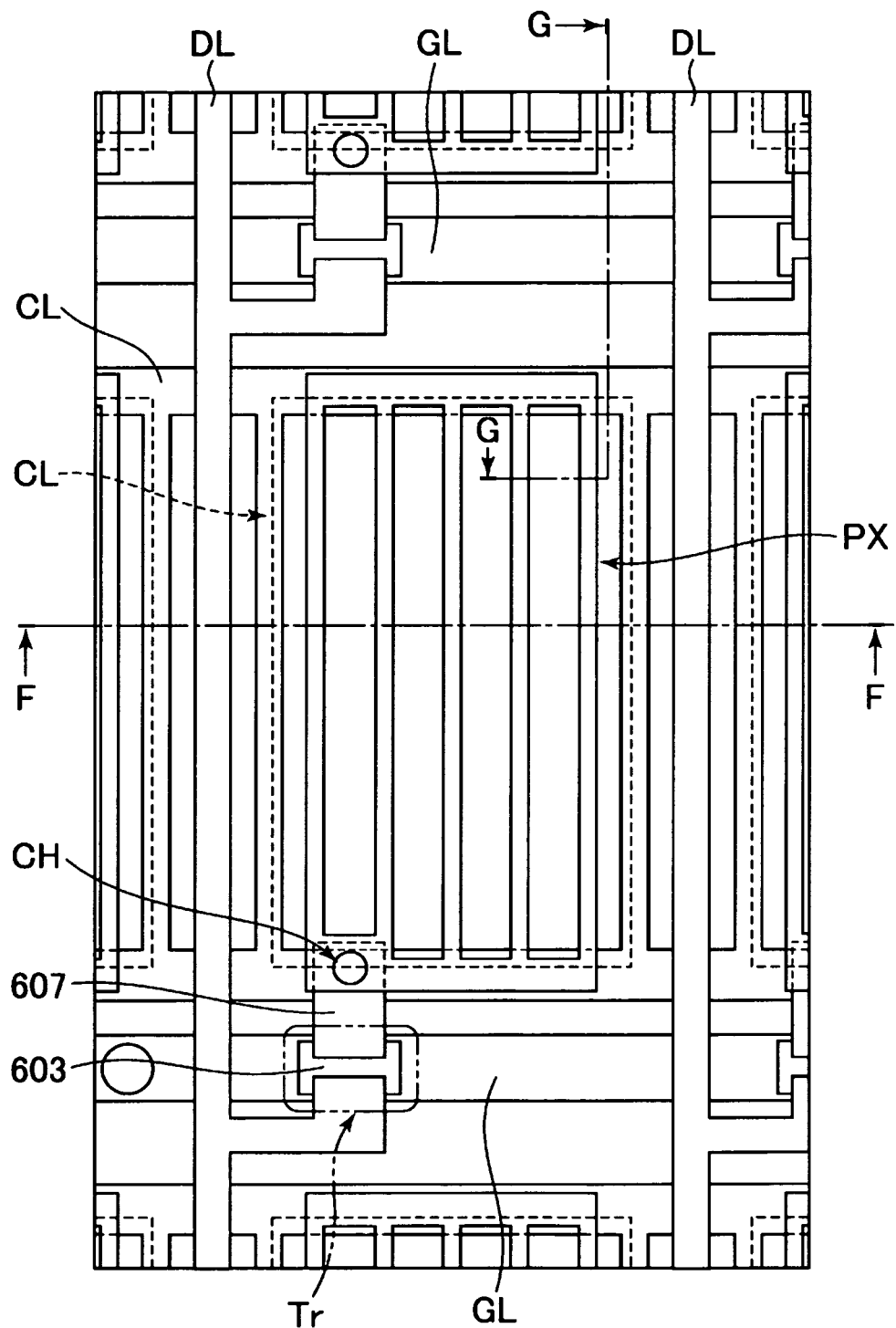
FIG. 3A is a schematic plan view illustrating the planar structure of a single pixel of an active matrix substrate in a liquid crystal panel according to Example 2 of the present invention.
Figure 3B:
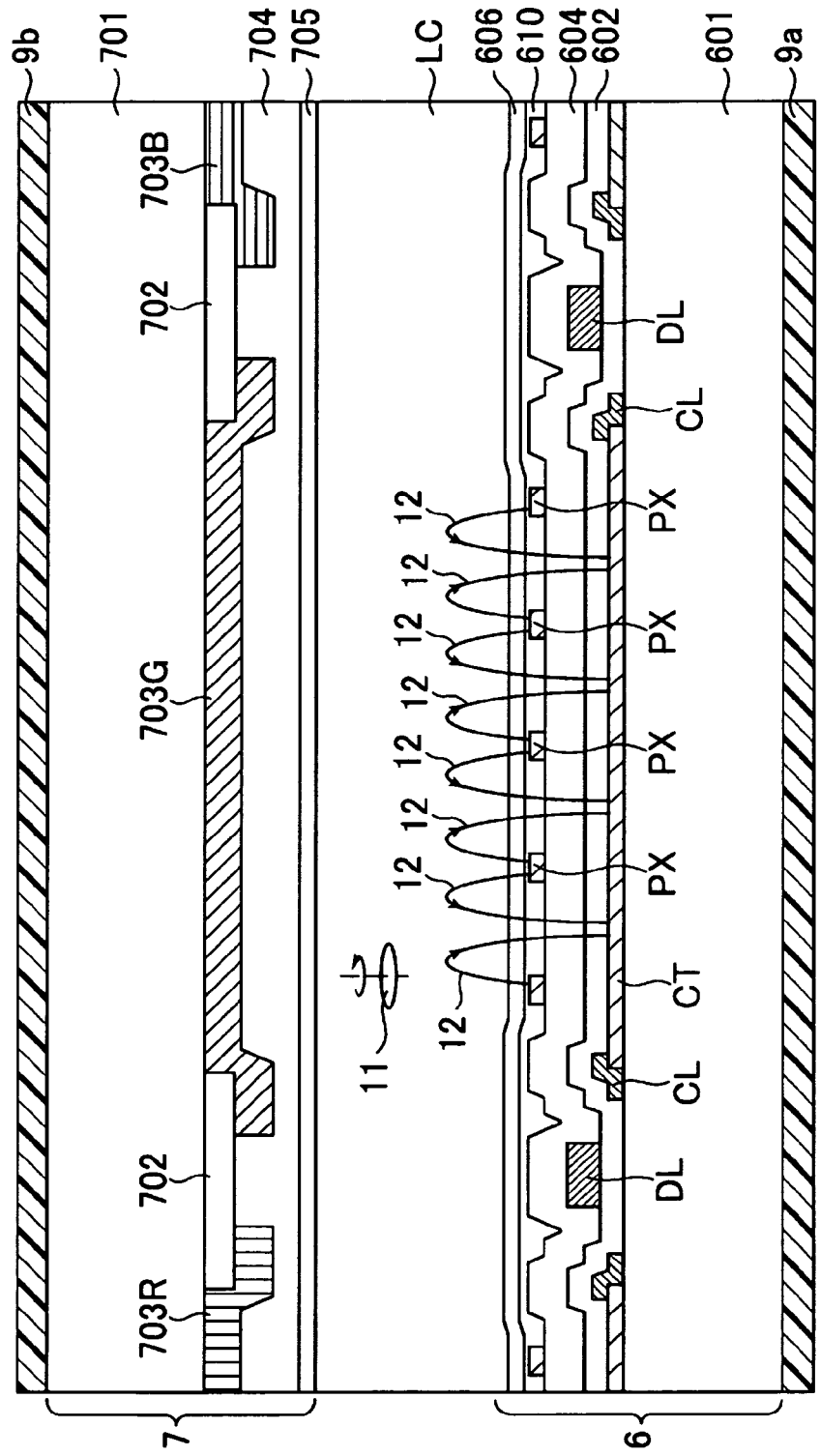
FIG. 3B is a schematic sectional view illustrating a sectional structure cut along the line F-F of FIG. 3A.
Figure 3C:
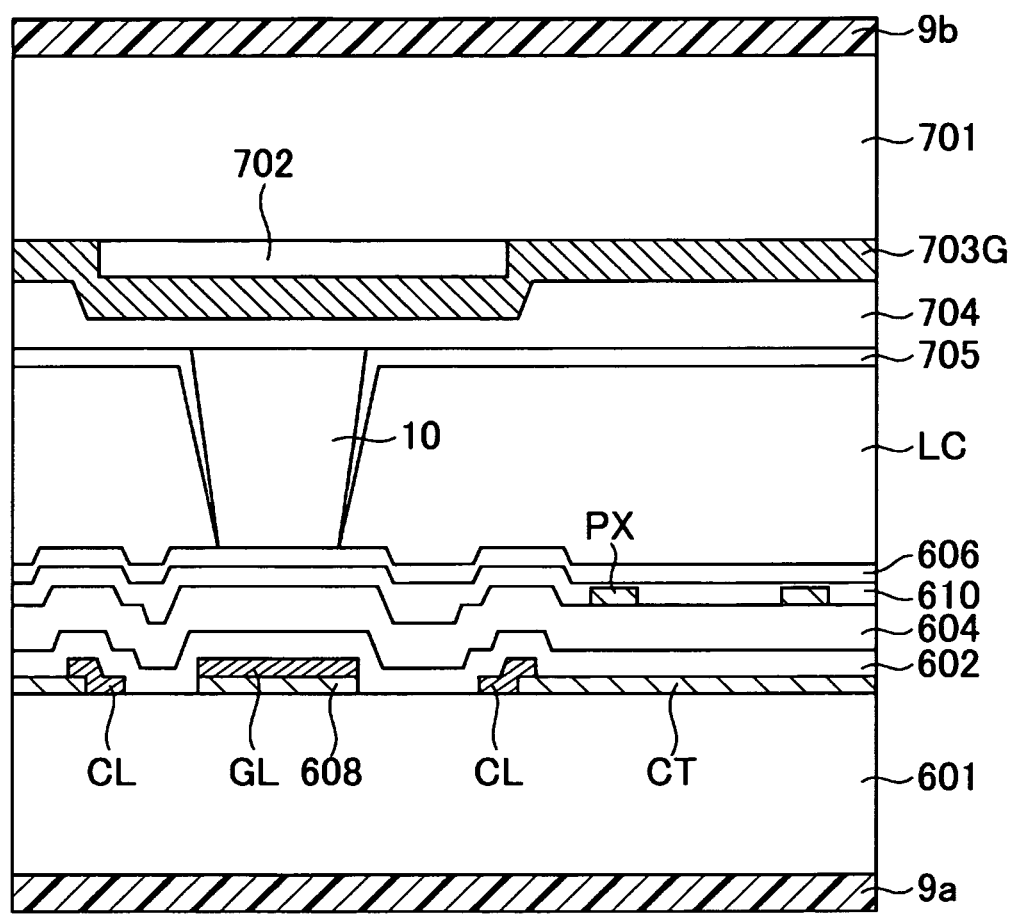
FIG. 3C is a schematic sectional view illustrating a sectional structure cut along the line G-G of FIG. 3A.

FIGS. 3A to 3C are schematic diagrams illustrating an example of the schematic structure of an FFS liquid crystal panel according to Example 2 of the present invention.

FIG. 3A is a schematic plan view illustrating the planar structure of a single pixel of an active matrix substrate (first substrate) in the liquid crystal panel of Example 2. FIG. 3B is a schematic sectional view illustrating a sectional structure cut along the line F-F of FIG. 3A. FIG. 3C is a schematic sectional view illustrating a sectional structure cut along the line G-G of FIG. 3A. FIGS. 3B and 3C also illustrate the sectional structure of the liquid crystal layer LC (liquid crystal material) and the second substrate 7 which are located above the first substrate 6.

Example 2 takes a lateral field driving liquid crystal panel as an example of the liquid crystal panel 1 according to the present invention. In the liquid crystal panel 1 of Example 2, a single pixel and its surroundings are structured as illustrated in FIGS. 3A to 3C.

The first substrate 6 is an insulating substrate such as the glass substrate 601 on a surface of which the common electrode CT, the scanning signal lines GL, the common wiring line CL, and the first insulating layer 602 are formed, with the first insulating layer 602 covering the common electrode CT, the scanning signal lines GL, and the common wiring line CL.

Formed on the first insulating layer 602 are the semiconductor layer 603 of the TFT element Tr, the video signal lines DL, and a source electrode 607, which are covered with the second insulating layer 604. A part of the video signal line DL and a part of the source electrode 607 rest on the semiconductor layer 603, and the parts resting on the semiconductor layer 603 function as a drain electrode and source electrode of the TFT element Tr.

In the liquid crystal panel 1 of Example 2, the third insulating layer 605 is not formed, and the pixel electrode PX and the first alignment film 606, which covers the pixel electrode PX, are formed on the second insulating layer 604. The pixel electrode PX is connected to the source electrode 607 through the contact hole CH (through hole) that passes through the second insulating layer 604.

The common electrode CT formed on the surface of the glass substrate 601 has a flat shape and located in an area surrounded by two adjacent scanning signal lines GL and two adjacent video signal lines DL (opening area). The pixel electrode PX that has a plurality of slits (four slits in FIG. 3A) is laid on top of the flat common electrode CT. The common electrodes CT of pixels that are side by side in the running direction of the scanning signal lines GL are made common by the common wiring line CL.

The second substrate 7 in the liquid crystal panel 1 of Example 2 has the same structure as that of the second substrate 7 in the liquid crystal panel 1 of Example 1. A detailed description on the structure of the second substrate 7 is therefore omitted here.

In forming the first substrate 6 of the liquid crystal panel 1 of Example 2, the common electrode CT, the scanning signal lines GL, and the common wiring line CL are formed first on a surface of the glass substrate 601. The common electrode CT is formed by, for example, forming an indium tin oxide (ITO) film with a thickness of about 0.05 μm and etching the ITO film. The scanning signal lines GL and the common wiring line CL are formed by, for example, forming a chromium film with a thickness of about 0.4 µm, and etching the chromium film.

When the procedure described above is used to form the common electrode CT and to form the scanning signal lines GL and the common wiring line CL, it is desirable to form a conductive layer 608 interposed between the glass substrate 601 and the scanning signal lines GL along with the common electrode CT at the time when the ITO film is etched. However, the conductive layer 608 may be omitted when the common electrode CT is sufficiently thinner than the scanning signal lines GL as in the case described above.

FIGS. 3B and 3C illustrate a sectional structure that is obtained when the scanning signal lines GL and the common wiring line CL are formed by forming and etching the chromium film after the common electrode CT is formed by etching the ITO film. Other procedures than this may be used to form the common electrode CT and to form the scanning signal lines GL and the common wiring line CL. For instance, the ITO film and the chromium film may be formed in succession, followed by the etching of the chromium film and the ITO film to form the common electrode CT and the conductive layer 608, and subsequently the etching of the chromium film alone to form the scanning signal lines GL and the common wiring line CL.

The first insulating layer 602 is formed next. The first insulating layer 602 is formed from, for example, a silicon nitride film with a thickness of about 0.2 µm. A deposition method such as CVD is generally used to form the first insulating layer 602. Level differences (surface irregularities) are therefore created on the surface of the first insulating layer 602 which reflect the shapes in plan view and thicknesses of the scanning signal lines GL, the common electrode CT, and the common wiring line CL.

Formed next are the semiconductor layer 603 of the TFT element Tr, the video signal lines DL, and the source electrode 607. The semiconductor layer 603, the video signal lines DL, and the source electrode 607 may be formed by the same procedure as the procedure of forming the semiconductor layer 603, the video signal lines DL, and the pixel electrode PX which has been described in Example 1. Specifically, an insular semiconductor film in which a first amorphous silicon layer and a second amorphous silicon layer are laminated is formed, then a chromium film is formed and etched to form the video signal lines DL and the source electrode 607, and subsequently the second amorphous silicon layer of the insular semiconductor film is etched to form the semiconductor layer 603.

Next, the second insulating layer 604 is formed. The second insulating layer 604 is formed from, for example, a silicon nitride film with a thickness of about 0.3 µm. A deposition method such as CVD is generally used to form the second insulating layer 604. Level differences (surface irregularities) are therefore created on the surface of the second insulating layer 604 which reflect the surface irregularities of the first insulating layer 602 and the shapes in plan view and thicknesses of the semiconductor layer 603, the video signal lines DL, and the source electrode 607. The level differences in the second insulating layer 604 include a concavity (concave portion) created along the running direction of the scanning signal lines GL between each scanning signal line GL and each common wiring line CL (common electrode CT).

Next, a contact hole passing through the second insulating layer 604 is formed above a predetermined area of the source electrode 607.

Next, the pixel electrode PX is formed. The pixel electrode PX is formed by, for example, forming an ITO film with a thickness of about 0.05 µm and etching the ITO film. At this time, the pixel electrode PX is formed to have a comb shape, so as to have a plurality of slits in plan view. The second insulating layer 604 acting as the base layer of the pixel electrode PX therefore has an exposed part which is not covered with the pixel electrode PX.

Next, the first alignment film-side transparent layer 610 is formed on the second insulating layer 604 as a base layer. In short, the first alignment film-side transparent layer 610 and the pixel electrode PX are both formed with the second insulating layer 604 as a base layer. The first alignment film-side transparent layer 610 in this example is a polysiloxane-based material that has a molecular structure expressed by Chemical Formula 3, and is formed to a thickness of 60 nm by dissolving the material in ethanol as a solvent, printing the resultant solution (4 wt %) on the second insulating layer 604, leveling at 80° C. for approximately two minutes, and heating at 150° C. for ten minutes.

In this example, three different polysiloxane-based materials, A, B, and C, were prepared by varying the compositions of R1 and R2 to fabricate three types of liquid crystal panel 1. R1 and R2 each represent an ethoxy group ($-OCH_2CH_3$) or a hydroxyl group ($-OH$). The composition ratio of R1 and R2 was 7:3 in the polysiloxane-based material A, 5:5 in the material B, and 3:7 in the material C. The specific resistance was $1.0E+13$ Ωcm in the polysiloxane-based material A, $1.0E+11$ Ωcm in the material B, and $1.0E+9$ Ωcm in the material C. The transmittance Y value is 99.5% in all of the materials A, B, and C.

The first alignment film 606 is formed next. The first alignment film 606 is formed by, for example, dissolving polyimide resin, or a precursor of polyimide resin, in a given solvent, applying the resultant solution (alignment film varnish), vaporizing the solvent through heating that is executed under given conditions to promote imidization reaction, and then performing rubbing treatment.

The inventors of the present invention prepared alignment film varnish obtained by blending polyamide acid ester, N-methyl-2-pyrrolidone (NMP), γ-butyrolactone (GBL), and butyl cellosolve (BC) at a weight ratio of 6:10:64:20. The alignment film varnish was printed (applied) by ink jet printing, dried at 70° C., and then continuously heated (baked) at 220° C. for thirty minutes to form the first alignment film 606. A portion of the obtained first alignment film 606 where the first alignment film 606 is formed directly on the first alignment film-side transparent layer 610 is approximately 50 nm in thickness.

The second substrate 7 of the liquid crystal panel 1 of Example 2 may be formed by a conventional procedure, and therefore a description thereof is omitted here. The inventors of the present invention formed the column spacer 10 approximately 4.2 µm in height on the overcoat layer 704, and then formed the second alignment film 705 of the second substrate 7 by the same procedure used to form the first alignment film 606 of the first substrate 6. The obtained second alignment film 705 is approximately 100 nm in thickness in an opening area (where the second alignment film 705 is formed directly on the color filter).

The inventors of the present invention tested three liquid crystal display devices including the three types of liquid crystal panel 1 of Example 2 for image sticking of a displayed image. In the image sticking test, a monochrome window pattern is displayed for eight hours on each liquid crystal display device, gradation display is subsequently executed by setting the entire screen to a gray level, and how long it takes for the window pattern (also referred to as image sticking or residual image) to fade is measured. A satisfactory image sticking fading time is thirty minutes or less. The image sticking fading time of the liquid crystal display device including the liquid crystal panel 1 according to this example was fifteen minutes in the case of the liquid crystal panel 1 using the polysiloxane-based material A whose specific resistance was 1.0E+13 Ωm, nine minutes in the case of the liquid crystal panel 1 using the polysiloxane-based material B whose specific resistance was 1.0E+11 Ωm, and four minutes in the case of the liquid crystal panel 1 using the polysiloxane-based material C whose specific resistance was 1.0E+9 Ωm. It was thus confirmed that the tested liquid crystal display devices all had fine image sticking characteristics.

Each liquid crystal display device including the liquid crystal panel 1 of Example 2 was also measured for transmittance and luminance. It was confirmed as a result that every measured liquid crystal display device had as fine characteristics as those of conventional liquid crystal display devices in terms of both transmittance and luminance.

Example 2 takes as an example the lateral field driving liquid crystal panel 1 that has pixels structured as illustrated in FIGS. 3A to 3C. However, the pixel structure (e.g., the shapes of the TFT element, the pixel electrode, and the common electrode in plan view (planar layout)) is not limited to the one illustrated in FIGS. 3A to 3C and may be modified to suit individual purposes.

EXAMPLE 3

Figure 4:
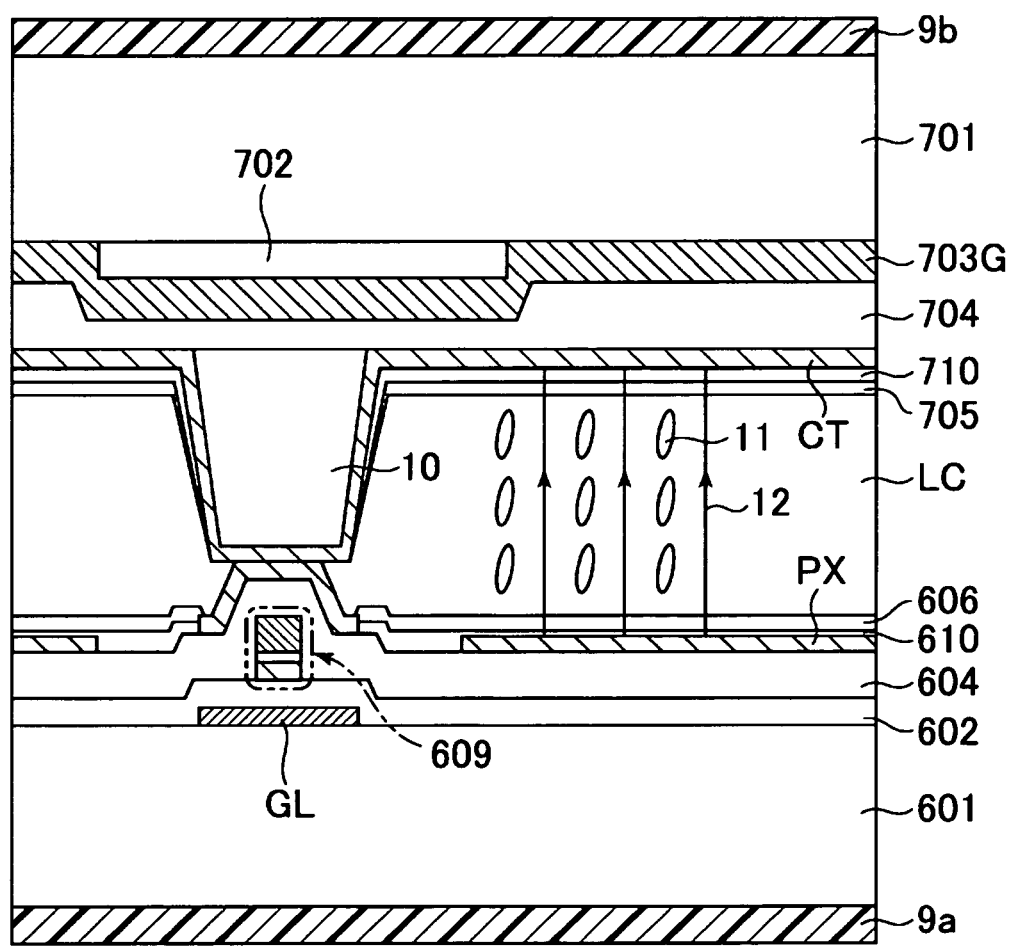
FIG. 4 is a schematic sectional view illustrating the sectional structure of a main part of a VA liquid crystal panel according to Example 3 of the present invention.

FIG. 4 is a schematic sectional view illustrating the sectional structure of a main part of a VA liquid crystal panel according to Example 3 of the present invention.

Example 3 takes a vertical field driving liquid crystal panel as an example of the liquid crystal panel 1 to which the present invention is applied. The vertical field driving liquid crystal panel 1 is structured, for example, as illustrated in FIG. 4, where the pixel electrode PX is formed on the first substrate 6 and the common electrode CT is formed on the second substrate 7.

In the case where the liquid crystal panel 1 employs VA, which is one of the vertical field driving methods, the pixel electrode PX and the common electrode CT are formed from a transparent conductor such as ITO into a simple flat shape. The liquid crystal molecules 11 in this case are aligned vertically with respect to the surfaces of the glass substrates 601 and 701 by the first alignment film 606 and the second alignment film 705 during a no-electric field application period in which the pixel electrode PX and the common electrode CT have an equal electric potential. When an electric potential difference is created between the pixel electrode PX and the common electrode CT, the electric field 12 (electric flux lines) substantially perpendicular to the glass substrates 601 and 701 is generated, flattening the liquid crystal molecules 11 in a direction parallel to the glass substrates 601 and 701 and changing the polarization state of incident light. At this time, the orientation of the liquid crystal molecules 11 is determined by the intensity of the electric field 12 applied. The liquid crystal display device can therefore display a video or an image by, for example, performing a pixel-based control of a video signal (gray scale voltage) to be applied to the pixel electrode PX and thus changing the light transmittance in individual pixels while fixing the electric potential of the common electrode CT.

Various structures are known as a pixel structure (e.g., shapes in plan view (planar layout) of the TFT element Tr and the pixel electrode PX) that is employed in the VA liquid crystal panel 1. The liquid crystal panel 1 of Example 3 employs one of those pixel structures. A detailed description on the pixel structure in the liquid crystal panel 1 is therefore omitted in Example 3.

In the liquid crystal panel 1 according to Example 3, the first alignment film-side transparent layer 610 is formed on the pixel electrode PX and the first alignment film 606 is formed on the first alignment film-side transparent layer 610. The first alignment film-side transparent layer 610 of Example 3 is formed from a polysiloxane-based inorganic material (also simply referred to as polysiloxane), but may instead be formed from a transparent organic resin material (polyisothianaphthene, poly-3,4-ethylenedioxythiophene, polypyrrole, or the like). The first alignment film 606 is formed from polyimide-based resin to a thickness of approximately 80 nm. The first alignment film 606 was measured to have a specific resistance of 1.0E+15 Ωcm.

Steps for forming the first alignment film-side transparent layer 610 are described next. The first alignment film-side transparent layer 610 in this example is a polysiloxane-based material that has a molecular structure expressed by Chemical Formula 1, and was formed to a thickness of 60 nm by dissolving the material in ethanol as a solvent, printing the resultant solution (4 wt %) on the second insulating layer 604 and the pixel electrode PX, leveling at 80° C. for approximately two minutes, and heating at 150° C. for ten minutes.

In this example, three different polysiloxane-based materials, A, B, and C, were prepared by varying the compositions of R1 and R2 to fabricate three types of liquid crystal panel 1. R1 and R2 each represent an ethoxy group (—OCH$_2$CH$_3$) or a hydroxyl group (—OH). The composition ratio of R1 and R2 was 7:3 in the polysiloxane-based material A, 5:5 in the material B, and 3:7 in the material C. The specific resistance was 1.0E+13 Ωcm in the polysiloxane-based material A, 1.0E+11 Ωcm in the material B, and 1.0E+9 Ωcm in the material C. The transmittance Y value was 99.5% in all of the materials A, B, and C.

The second substrate 7 of the liquid crystal panel 1 of Example 3 is obtained by forming the black matrix 702, the color filters 703R, 703G, and 703B, the overcoat layer 704, and the column spacers 10 on a surface of the glass substrate 701 and subsequently forming the common electrode CT from a transparent conductive film such as an ITO film. A transparent layer (second alignment film-side transparent layer) 710 is formed on the common electrode CT as the first alignment film-side transparent layer 610 is formed on the side of the first substrate 6. The second alignment film 705 is formed on the second alignment film-side transparent layer 710 as the first alignment film 606 is formed on the side of the first substrate 6.

The liquid crystal panel 1 of Example 3 can be manufactured by the same procedure that is used to manufacture a conventional VA liquid crystal panel. The first alignment film-side transparent layer 610 and the second alignment film-side transparent layer 710 can be formed by the same method that is used to form the first alignment film-side transparent layer 610 in Example 1 and Example 2. A detailed description on a method of manufacturing the liquid crystal panel 1 of Example 3 is therefore omitted.

The inventors of the present invention tested three liquid crystal display devices for image sticking of a displayed image in the manner described in Example 1. The three liquid crystal display devices respectively include three types of liquid crystal panel 1 of Example 3 obtained by sealing a VA-use liquid crystal material, which has a negative dielectric anisotropy Δ∈, between the first substrate 6 and the second substrate 7 that are structured as above.

The image sticking fading time of the liquid crystal display device including the liquid crystal panel 1 according to this example was nine minutes in the case of the liquid crystal panel 1 using the polysiloxane-based material A whose specific resistance was 1.0E+13 Ωm, four minutes in the case of the liquid crystal panel 1 using the polysiloxane-based material B whose specific resistance was 1.0E+11 Ωm, and one minute in the case of the liquid crystal panel 1 using the polysiloxane-based material C whose specific resistance was 1.0E+9 Ωm. It was thus confirmed that the tested liquid crystal display devices all had fine image sticking characteristics.

The liquid crystal display device including the liquid crystal panel 1 of Example 3 was also measured for transmittance and luminance. It was confirmed as a result that every measured liquid crystal display device had as fine characteristics as those of conventional liquid crystal display devices in terms of both transmittance and luminance.

Example 3 takes the VA liquid crystal panel 1 as an example. However, Example 3 is not limited to this structure, and is applicable to other vertical field driving liquid crystal panels such as a TN liquid crystal panel. In that case, the pixel structure such as the shapes in plan view (planar layout) of the TFT element and the pixel electrode may be modified to suit individual cases.

EXAMPLE 4

In this example, a liquid crystal display device was manufactured the same way as in Example 1, except that the first alignment film-side transparent layer 610, which was formed from a polysiloxane-based material in the liquid crystal panel 1 of Example 1, was formed from poly-3,4-ethylenedioxythiophene, which was an organic resin material. The thickness of a poly-3,4-ethylenedioxythiophene film constituting the first alignment film-side transparent layer 610 was set to 30 nm. The poly-3,4-ethylenedioxythiophene film had a specific resistance of 5.0E+13 Ωcm and a transmittance Y value of 98.0%.

The inventors of the present invention tested a liquid crystal display device including the liquid crystal panel 1 of Example 4 for image sticking of a displayed image in the manner described in Example 1. It was confirmed as a result that the image sticking fading time of the tested liquid crystal display device was 20 minutes, which was a satisfactory level.

The liquid crystal display device including the liquid crystal panel 1 of Example 4 was also measured for transmittance and luminance. It was confirmed as a result that the measured liquid crystal display device had as fine characteristics as those of conventional liquid crystal display devices in terms of both transmittance and luminance.

While poly-3,4-ethylenedioxythiophene was used for the first alignment film-side transparent layer 610 in this example, it was confirmed that a polyisothianaphthene derivative and a polypyrrole derivative, too, brought about the same effect.

EXAMPLE 5

In this example, a liquid crystal display device was manufactured the same way as in Example 2, except that the first alignment film-side transparent layer 610, which was formed from a polysiloxane-based material in the liquid crystal panel 1 of Example 2, was formed from poly-3,4-ethylenedioxythiophene, which was an organic resin material. The thickness of a poly-3,4-ethylenedioxythiophene film constituting the first alignment film-side transparent layer 610 was set to 30 nm. The poly-3,4-ethylenedioxythiophene film had a specific resistance of 5.0E+13 Ωcm and a transmittance Y value of 98.0%.

The inventors of the present invention tested a liquid crystal display device including the liquid crystal panel 1 of Example 5 for image sticking of a displayed image in the manner described in Example 1. It was confirmed as a result that the image sticking fading time of the tested liquid crystal display device was 25 minutes, which was a satisfactory level.

The liquid crystal display device including the liquid crystal panel 1 of Example 5 was also measured for transmittance and luminance. It was confirmed as a result that the measured liquid crystal display device had as fine characteristics as those of conventional liquid crystal display devices in terms of both transmittance and luminance.

While poly-3,4-ethylenedioxythiophene was used for the first alignment film-side transparent layer 610 in this example, it was confirmed that a polyisothianaphthene derivative and a polypyrrole derivative, too, brought about the same effect.

EXAMPLE 6

In this example, a liquid crystal display device was manufactured the same way as in Example 3, except that the first alignment film-side transparent layer 610 and the second alignment film-side transparent layer 710, which were formed from a polysiloxane-based material in the liquid crystal panel 1 of Example 3, were formed from poly-3,4-ethylenedioxythiophene. The thickness of a poly-3,4-ethylenedioxythiophene film constituting each of the first alignment film-side transparent layer 610 and the second alignment film-side transparent layer 710 was set to 30 nm. The poly-3,4-ethylenedioxythiophene film had a specific resistance of 5.0E+13 Ωcm and a transmittance Y value of 98.0%.

The inventors of the present invention tested a liquid crystal display device including the liquid crystal panel 1 of Example 6 for image sticking of a displayed image in the manner described in Example 1. It was confirmed as a result that the image sticking fading time of the tested liquid crystal display device was 18 minutes, which was a satisfactory level.

The liquid crystal display device including the liquid crystal panel 1 of Example 6 was also measured for transmittance and luminance. It was confirmed as a result that the measured liquid crystal display device had as fine characteristics as those of conventional liquid crystal display devices in terms of both transmittance and luminance.

While poly-3,4-ethylenedioxythiophene was used for the first alignment film-side transparent layer 610 and the second alignment film-side transparent layer 710 in this example, it was confirmed that a polyisothianaphthene derivative and a polypyrrole derivative, too, brought about the same effect.

EXAMPLE 7

Figure 5:
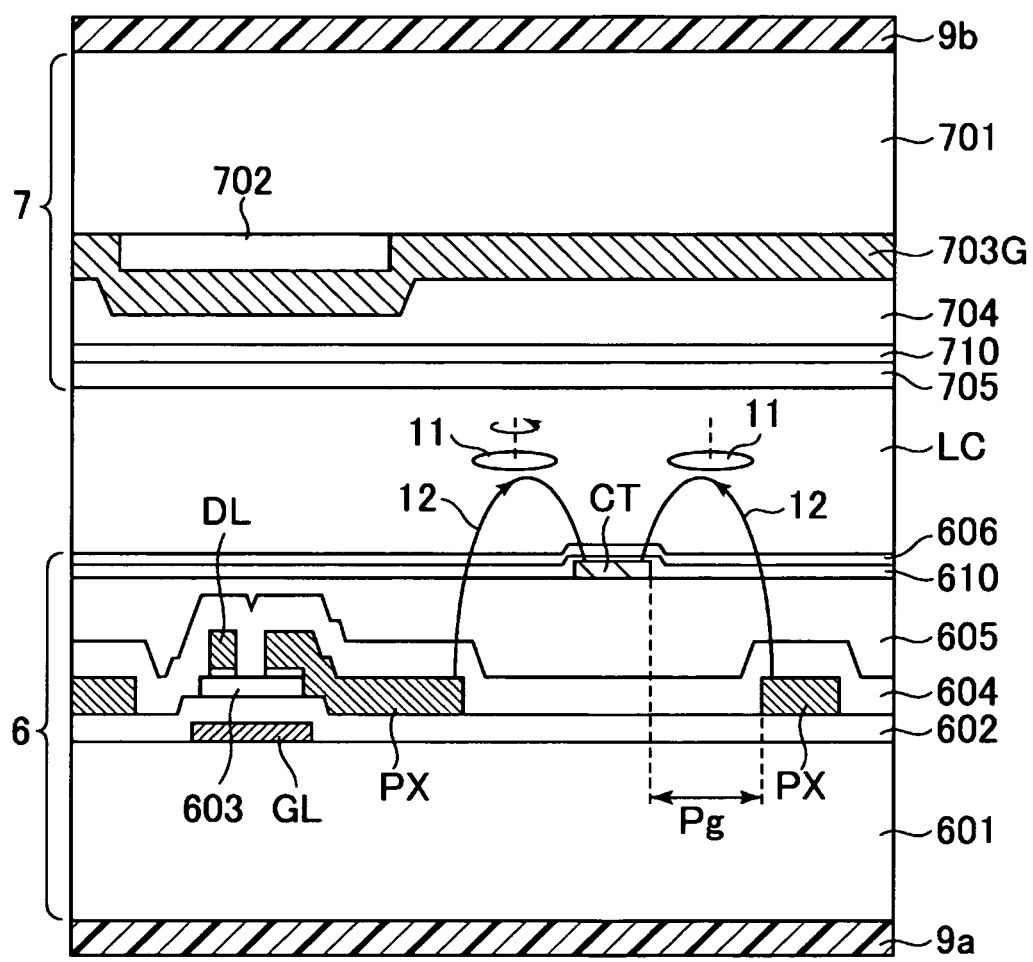
FIG. 5 is a schematic sectional view illustrating the sectional structure of a main part of a liquid crystal panel according to Example 7 of the present invention.

In this example, a liquid crystal display device was manufactured the same way as in Example 1, except that the second alignment film-side transparent layer 710 was added on the side of the counter substrate (second substrate) 7 to the liquid crystal panel 1 of Example 1 as illustrated in FIG. 5. The first alignment film-side transparent layer 610 and the second alignment film-side transparent layer 710 in this example were formed from the polysiloxane-based material A by the same method as in Example 1.

The inventors of the present invention tested a liquid crystal display device including the liquid crystal panel 1 of Example 7 for image sticking of a displayed image in the manner described in Example 1. It was confirmed as a result that the image sticking fading time of the tested liquid crystal display device was nine minutes, which was a satisfactory level.

The liquid crystal display device including the liquid crystal panel 1 of Example 7 was also measured for transmittance and luminance. It was confirmed as a result that the measured liquid crystal display device had as fine characteristics as those of conventional liquid crystal display devices in terms of both transmittance and luminance.

EXAMPLE 8

Figure 6:
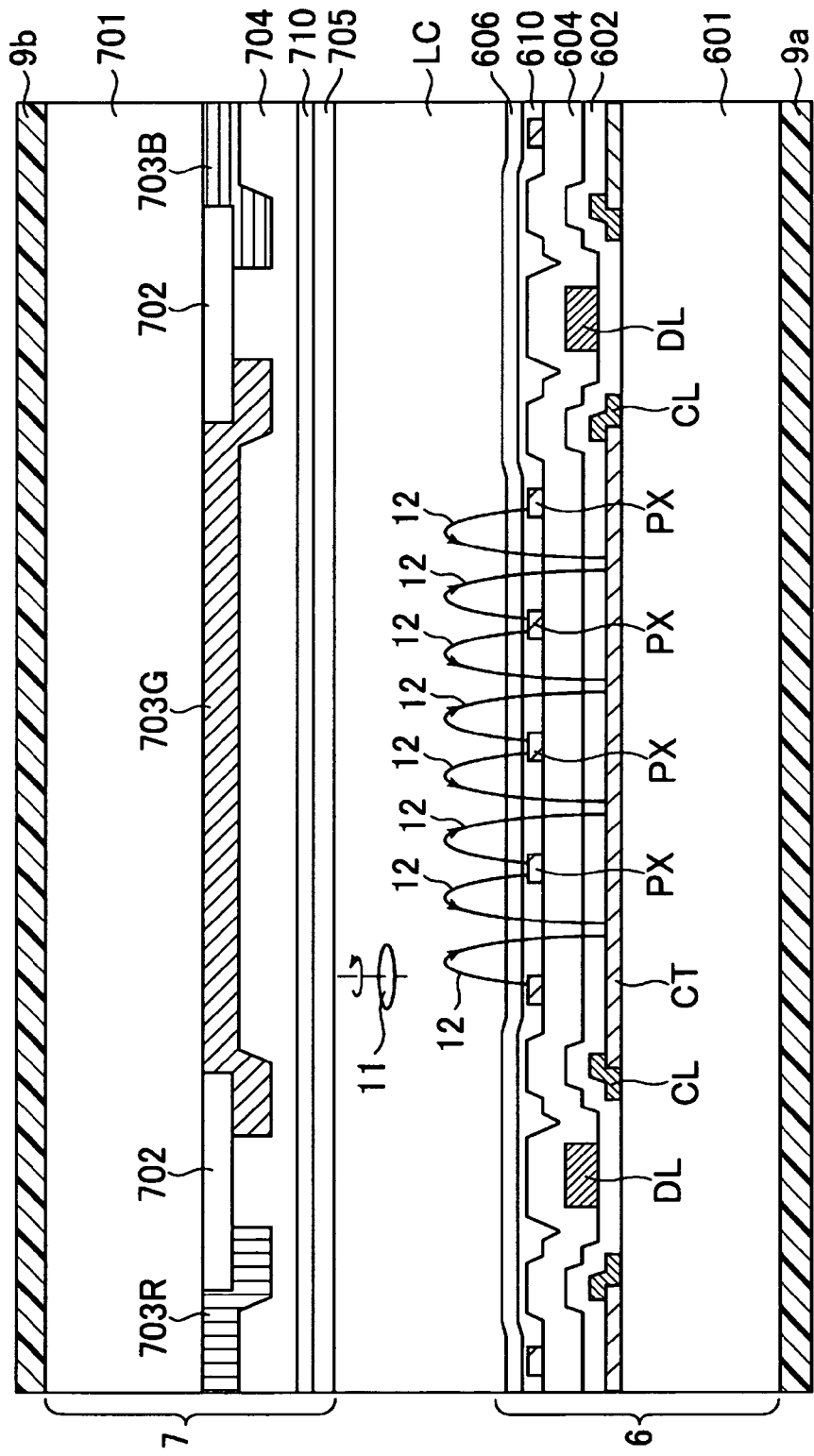
FIG. 6 is a schematic sectional view illustrating the sectional structure of a main part of a liquid crystal panel according to Example 8 of the present invention.

In this example, a liquid crystal display device was manufactured the same way as in Example 2, except that the second alignment film-side transparent layer 710 was added on the side of the counter substrate (second substrate) 7 to the liquid crystal panel 1 of Example 2 as illustrated in FIG. 6. The first alignment film-side transparent layer 610 and the second alignment film-side transparent layer 710 in this example were formed from the polysiloxane-based material A by the same method as in Example 2.

The inventors of the present invention tested a liquid crystal display device including the liquid crystal panel 1 of Example 8 for image sticking of a displayed image in the manner described in Example 1. It was confirmed as a result that the image sticking fading time of the tested liquid crystal display device was ten minutes, which was a satisfactory level.

The liquid crystal display device including the liquid crystal panel 1 of Example 8 was also measured for transmittance and luminance. It was confirmed as a result that the measured liquid crystal display device had as fine characteristics as those of conventional liquid crystal display devices in terms of both transmittance and luminance.

EXAMPLE 9

Figure 7:
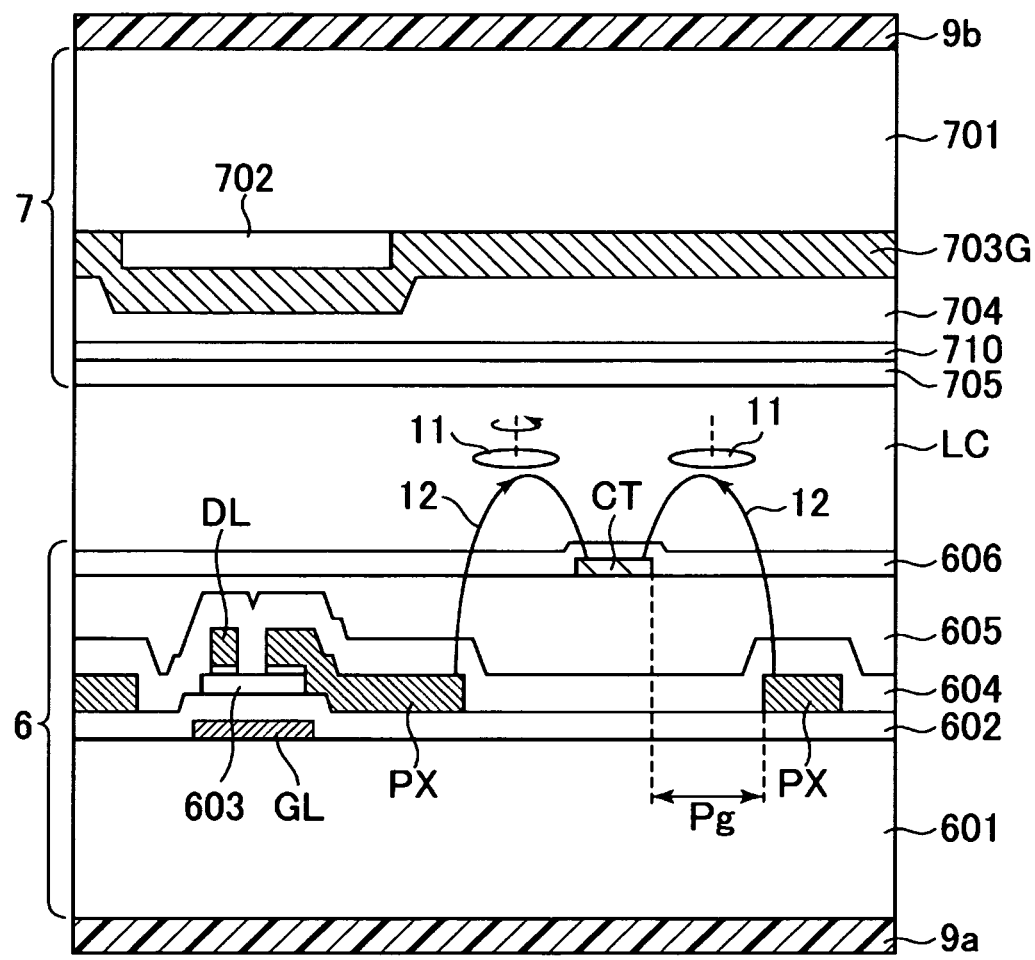
FIG. 7 is a schematic sectional view illustrating the sectional structure of a main part of a liquid crystal panel according to Example 9 of the present invention.

In this example, a liquid crystal display device was manufactured the same way as in Example 7, except that the second alignment film-side transparent layer 710 on the side of the second substrate 7 was formed alone in the liquid crystal panel 1 of Example 7, without forming the first alignment film-side transparent layer 610 on the side of the first substrate 6, as illustrated in FIG. 7. The second alignment film-side transparent layer 710 in this example was formed from the polysiloxane-based material A by the same method as in Example 7.

The inventors of the present invention tested a liquid crystal display device including the liquid crystal panel 1 of Example 9 for image sticking of a displayed image in the manner described in Example 1. It was confirmed as a result that the image sticking fading time of the tested liquid crystal display device was 25 minutes, which was a satisfactory level.

The liquid crystal display device including the liquid crystal panel 1 of Example 9 was also measured for transmittance and luminance. It was confirmed as a result that the measured liquid crystal display device had as fine characteristics as those of conventional liquid crystal display devices in terms of both transmittance and luminance.

EXAMPLE 10

Figure 8:
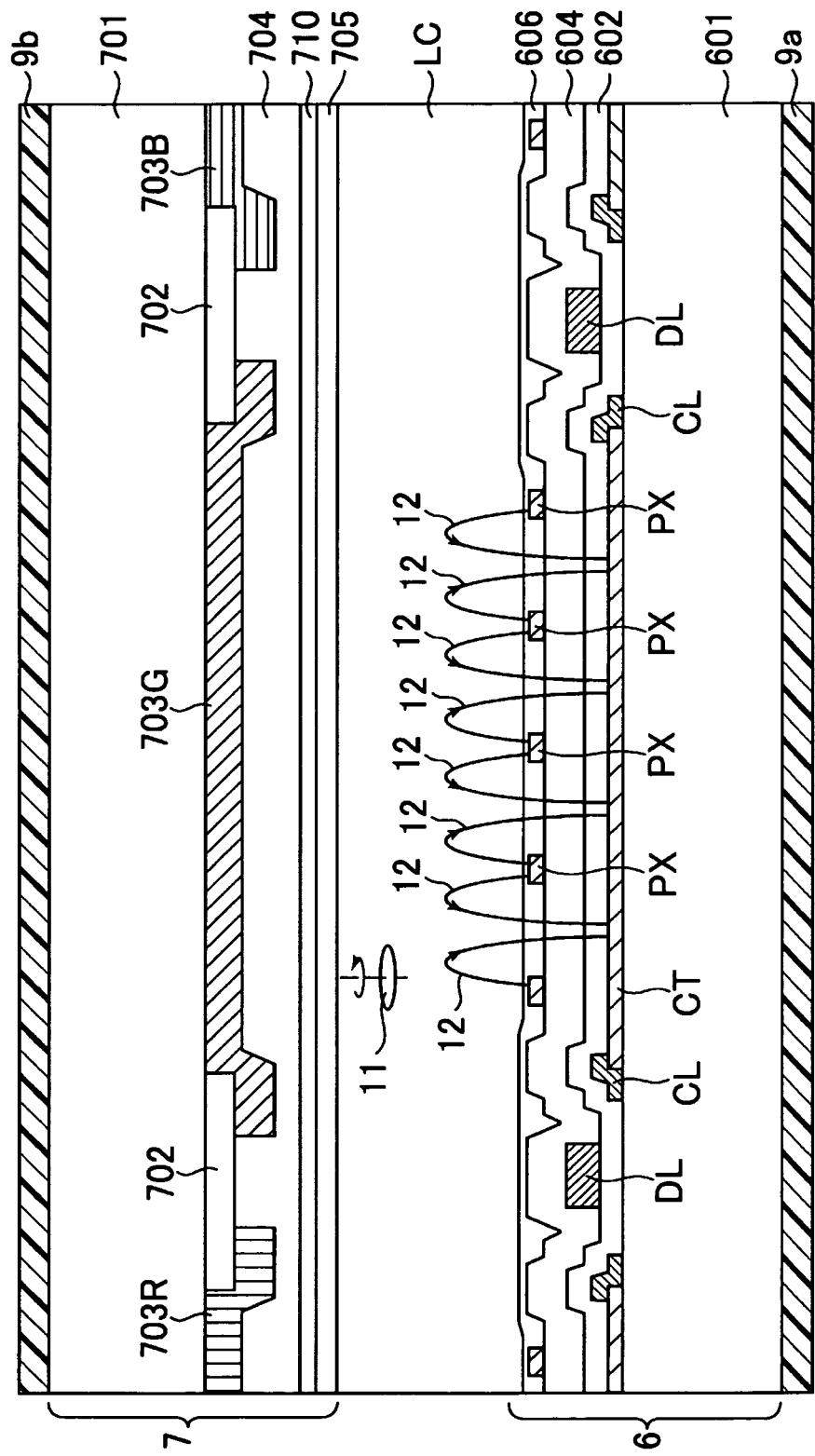
FIG. 8 is a schematic sectional view illustrating the sectional structure of a main part of a liquid crystal panel according to Example 10 of the present invention.

In this example, a liquid crystal display device was manufactured the same way as in Example 8, except that the second alignment film-side transparent layer 710 on the side of the second substrate 7 was formed alone in the liquid crystal panel 1 of Example 8, without forming the first alignment film-side transparent layer 610 on the side of the first substrate 6, as illustrated in FIG. 8. The second alignment film-side transparent layer 710 in this example was formed from the polysiloxane-based material A by the same method as in Example 8.

The inventors of the present invention tested a liquid crystal display device including the liquid crystal panel 1 of Example 10 for image sticking of a displayed image in the manner described in Example 1. It was confirmed as a result that the image sticking fading time of the tested liquid crystal display device was 28 minutes, which was a satisfactory level.

The liquid crystal display device including the liquid crystal panel 1 of Example 10 was also measured for transmittance and luminance. It was confirmed as a result that the measured liquid crystal display device had as fine characteristics as those of conventional liquid crystal display devices in terms of both transmittance and luminance.

EXAMPLE 11

In this example, a liquid crystal display device was manufactured in the same way as in Example 2, except that the first alignment film-side transparent layer 610 was formed from the polysiloxane-based material A in the liquid crystal panel 1 of Example 2 while varying its thickness in four conditions of 10 nm, 30 nm, 60 nm, and 100 nm.

The inventors of the present invention tested four liquid crystal display devices including the four types of liquid crystal panel 1 of Example 11 for image sticking of a displayed image in the manner described in Example 1. The image sticking fading time was fifty-five minutes in the case of the liquid crystal display device whose first alignment film-side transparent layer 610 was 10 nm in thickness, forty-five minutes in the case of the liquid crystal display device whose first alignment film-side transparent layer 610 was 30 nm in thickness, fifteen minutes in the case of the liquid crystal display device whose first alignment film-side transparent layer 610 was 60 nm in thickness, and five minutes in the case of the liquid crystal display device whose first alignment film-side transparent layer 610 was 100 nm in thickness. The thickness of the first alignment film-side transparent layer 610 is defined herein by a gap formed between the interface of the first alignment film-side transparent layer 610 with its base layer (in FIG. 2C, third insulating layer 605) and the interface of the first alignment film-side transparent layer 610 with the first alignment film 606. According to this example, it was thus confirmed that, although the first alignment film-side transparent layer 610 that was 10 nm in thickness had an effect of reducing image sticking, a greater image sticking reduction effect may be obtained when the first alignment film-side transparent layer 610 was thicker than the 50 nm-thick pixel electrode PX and had a thickness of 60 nm or more.

Around the edges of the pixel electrode PX close to the first alignment film 606, a very intense electric field is applied to the liquid crystal layer LC and the concentration of electric field causes image sticking, which results in a problem. In this example, the first alignment film-side transparent layer 610 is formed by a wet process to a thickness thicker than the pixel electrode PX, and the first alignment film-side transparent layer 610 is used as a planarizing layer for evening out the level differences of the pixel electrode P. Thus, the intensity of the electric field to be applied around the edges of the pixel electrode PX is lessened, and the risk of image sticking is reduced further. Desirably, the first alignment film 606 and the first alignment film-side transparent layer 610 may be formed to have a combined thickness of 50 nm or more.

If the first alignment film-side transparent layer 610 and the first alignment film 606 are too thick, the intensity of an electric field applied to the liquid crystal layer LC is diminished. In view of this, the combined thickness of these films may desirably be 150 nm or less. In this specification, the thickness of the first alignment film 606 and the thickness of the first alignment film-side transparent layer 610 each refers to the thickness of a part that does not have a groove formed by rubbing treatment.

The liquid crystal display device including the liquid crystal panel 1 of Example 11 was also measured for transmittance and luminance. It was confirmed as a result that the measured liquid crystal display device had as fine characteristics as those of conventional liquid crystal display devices in terms of both transmittance and luminance.

EXAMPLE 12

In this example, a liquid crystal display device was manufactured in the same way as in Example 2, except that the first alignment film-side transparent layer 610 in the liquid crystal panel 1 of Example 2 was formed by dispersing silica fine particles having hydroxyl groups on the surface in the polysiloxane-based material A.

Silica fine particles (mean particle size: 10 nm) having hydroxyl groups on the surface were mixed in the ethanol-based solvent of the polysiloxane-based material A so that the weight ratio of the polysiloxane-based material A and the silica fine particles is 1:1. The mixture was printed on the second insulating layer 604 and the pixel electrode PX, leveled at 80° C. for approximately two minutes, and heated at 150° C. for ten minutes, to thereby form the film to a thickness of 60 nm. The first alignment film-side transparent layer 610 according to this example had a specific resistance of $1.0E+12$ $\Omega$cm and a transmittance Y value of 99.3%. Adding silica fine particles that have hydroxyl groups on the surface to the transparent layer thus lowers the specific resistance of the transparent layer.

The inventors of the present invention tested a liquid crystal display device including the liquid crystal panel 1 of Example 12 for image sticking of a displayed image in the manner described in Example 1. It was confirmed as a result that the image sticking fading time of the tested liquid crystal display device was 5 minutes, which was a satisfactory level.

The liquid crystal display device including the liquid crystal panel 1 of Example 12 was also measured for transmittance and luminance. It was confirmed as a result that the measured liquid crystal display device had as fine characteristics as those of conventional liquid crystal display devices in terms of both transmittance and luminance.

Aside from the liquid crystal display device of this example, liquid crystal display devices were manufactured with the mean particle size of the silica fine particles being set to 30 nm and 50 nm. The first alignment film-side transparent layer 610 in which the mean particle size of the silica fine particles was 30 nm was 98.0% in transmittance Y value, while the first alignment film-side transparent layer 610 in which the mean particle size of the silica fine particles was 50 nm was 97.0% in transmittance Y value. These liquid crystal display devices were measured for transmittance and luminance. As a result, the liquid crystal display device in which the mean particle size of the silica fine particles is 30 nm has been found to have as fine characteristics as conventional liquid crystal display devices in terms of both transmittance and luminance. The liquid crystal display device in which the mean particle size of the silica fine particles was 50 nm, on the other hand, registered a luminance that was 92% of the luminance of conventional liquid crystal display devices, and was confirmed to be lower in luminance.

EXAMPLE 13

In this example, a liquid crystal display device was manufactured in the same way as in Example 2, except that the first alignment film-side transparent layer 610 in the liquid crystal panel 610 of Example 2 was formed by dispersing gold fine particles as metal fine particles on the surface in the polysiloxane-based material A.

Gold fine particles (mean particle size: 10 nm) were mixed in the ethanol-based solvent of the polysiloxane-based material A so that the weight ratio of the polysiloxane-based material A and the silica fine particles was 10:1. The mixture was printed on the gold insulating layer 604 and the pixel electrode PX, leveled at 80° C. for approximately two minutes, and heated at 150° C. for ten minutes, to thereby form the film to a thickness of 60 nm. The first alignment film-side transparent layer 610 according to this example had a specific resistance of $1.0E+9$ $\Omega$cm and a transmittance Y value of 98.0%. Adding gold fine particles to the transparent layer thus lowers the specific resistance of the transparent layer.

The inventors of the present invention tested a liquid crystal display device including the liquid crystal panel 1 of Example 13 for image sticking of a displayed image in the manner described in Example 1. It was confirmed as a result that the image sticking fading time of the tested liquid crystal display device was 1 minute, which was a satisfactory level.

The liquid crystal display device including the liquid crystal panel 1 of Example 13 was also measured for transmittance and luminance. It was confirmed as a result that the measured liquid crystal display device had as fine characteristics as those of conventional liquid crystal display devices in terms of both transmittance and luminance.

The metal fine particles used in this example were gold fine particles, but fine particles of other types of metal such as silver particles or copper particles may be employed instead.

EXAMPLE 14

In this example, a liquid crystal display device was manufactured in the same way as in Example 2, except that the polysiloxane-based material B was used as a polysiloxane-based material that forms the first alignment film-side transparent layer 610 in the liquid crystal panel 1 of Example 2, while polyimide having polyamic acid ester as a precursor was used to form the first alignment film 606 and the second alignment film 705.

The polyimide having polyamic acid ester as a precursor had a specific resistance of $1.0E+15$ $\Omega$cm in this example. Compared to polyimide that has polyamic acid as a precursor, polyimide that has polyamic acid ester as a precursor is higher in specific resistance and accordingly increases the risk of image sticking.

The inventors of the present invention tested a liquid crystal display device including the liquid crystal panel 1 of Example 14 for image sticking of a displayed image in the manner described in Example 1. It was confirmed as a result that the image sticking fading time of the tested liquid crystal display device was 15 minutes, which was a satisfactory level.

The liquid crystal display device including the liquid crystal panel 1 of Example 14 was also measured for transmittance and luminance. It was confirmed as a result that the measured liquid crystal display device had as fine characteristics as those of conventional liquid crystal display devices in terms of both transmittance and luminance.

EXAMPLE 15

In this example, the polysiloxane-based material B was used as a polysiloxane-based material for forming the first alignment film-side transparent layer 610 in the liquid crystal panel 1 of Example 2. The first alignment film 606 and the second alignment film 705 were formed from polyimide that has as a precursor polyamic acid ester containing photo-reactive groups. The alignment treatment employed was photo-alignment in which the films were irradiated with polarized ultraviolet rays. The rest of a liquid crystal display device manufactured in this example was the same as the liquid crystal display device of Example 2.

The specific resistance of the polyimide forming the first alignment film 606 and the second alignment film 705 was $3.0E+15$ Ωcm in this example. With photo-alignment, the specific resistance of the alignment films becomes higher than in rubbing, and the risk of image sticking consequently rises.

The inventors of the present invention tested a liquid crystal display device including the liquid crystal panel 1 of Example 15 for image sticking of a displayed image in the manner described in Example 1. It was confirmed as a result that the image sticking fading time of the tested liquid crystal display device was 26 minutes, which was a satisfactory level.

The liquid crystal display device including the liquid crystal panel 1 of Example 15 was also measured for transmittance and luminance. It was confirmed as a result that the measured liquid crystal display device had as fine characteristics as those of conventional liquid crystal display devices in terms of both transmittance and luminance.

EXAMPLE 16

In this example, a liquid crystal display device was manufactured in the same way as in Example 2, except that the polysiloxane-based material C was used as a polysiloxane-based for forming the first alignment film-side transparent layer 610 in the liquid crystal panel 1 of Example 2, while the liquid crystal composition A forming the liquid crystal layer LC was replaced by a liquid crystal composition B having a specific resistance of $5.0E+13$ Ωcm or a liquid crystal composition C having a specific resistance of $1.0E+14$ Ωcm.

The inventors of the present invention tested two liquid crystal display devices including the two types of liquid crystal panel 1 of Example 16 for image sticking of a displayed image in the manner described in Example 1. The image sticking fading time was fourteen minutes in the liquid crystal display device using the liquid crystal composition B, and twenty-four minutes in the liquid crystal display device using the liquid crystal composition C. It was thus confirmed that the tested liquid crystal display devices had fine image sticking characteristics.

When a liquid crystal composition forming the liquid crystal layer LC has a high specific resistance, it becomes difficult for the liquid crystal layer LC to remedy the accumulation of DC charges at the interface between the liquid crystal layer LC and the alignment films 606 and 705, which rises the risk of image sticking as a result.

The liquid crystal display devices including the two types of liquid crystal panel 1 of Example 16 were also measured for transmittance and luminance. It was confirmed as a result that the measured liquid crystal display device had as fine characteristics as those of conventional liquid crystal display devices in terms of both transmittance and luminance.

EXAMPLE 17

In this example, a liquid crystal display device was manufactured in the same way as in Example 2, except that the first alignment film-side transparent layer 610 in the liquid crystal panel 1 of Example 2 was formed from a polysiloxane-based material having a specific resistance of $1.0E+10$ Ωcm, in so-called sea-island shapes respectively making the display area coverage of 50% and 80% provided by the polysiloxane-based material.

The inventors of the present invention tested two liquid crystal display devices including the two types of liquid crystal panel 1 of Example 17 for image sticking of a displayed image in the manner described in Example 1. The image sticking fading time was twenty-seven minutes in the liquid crystal display device in which the coverage provided by the polysiloxane-based material is 50%, and sixteen minutes in the liquid crystal display device in which the coverage provided by the polysiloxane-based material is 80%. The image sticking reduction effect in these cases is smaller than in the cases where the first alignment film-side transparent layer 610 is thicker than the electrode formed on the third insulating layer, which is the base layer of the first alignment film-side transparent layer 610, and covers the entire display area. However, it was thus confirmed that even the first alignment film-side transparent layer 610 that did not cover the entire display area as in this example had an effect of reducing image sticking.

The liquid crystal display devices including the two types of liquid crystal panel 1 of Example 17 were also measured for transmittance and luminance. It was confirmed as a result that the measured liquid crystal display device had as fine characteristics as those of conventional liquid crystal display devices in terms of both transmittance and luminance.

EXAMPLE 18

This example is the same as Example 2, except that the thickness of the first alignment film 606 and the thickness of the first alignment film-side transparent layer 610 are varied in three stages as illustrated in the following Table 1, in the liquid crystal panel 1 of Example 2 that uses the polysiloxane-based material B. Three liquid crystal display devices 181 to 183 were thus manufactured.

TABLE 1

| Liquid crystal display | First alignment film thickness (nm) | Transparent layer thickness (nm) |
|---|---|---|
| 181 | 20 | 130 |
| 182 | 50 | 50 |
| 183 | 30 | 20 |

In Table 1, "transparent layer thickness" refers to, as described above, the thickness of the first alignment film-side transparent layer 610 measured with an exposed part of the base layer (the insulating layer 604) which is not covered with the pixel electrode PX as the reference. It should be noted that, for stable film formation, the first alignment film 606 and the first alignment film-side transparent layer 610 each may need to have a thickness of 20 nm.

In each of the three sets of an alignment film and a transparent layer, the combined specific resistance of the alignment film and the transparent layer in their film thickness direction was 1.0E+14 Ωcm or less, and the combined transmittance of the alignment film and the transparent layer was 97.5% or higher. The specific resistance of the second alignment film 705 formed on the side of the second substrate 7 was 1.0E+15 Ωcm.

The inventors of the present invention tested three liquid crystal display devices including the two types of liquid crystal panel 1 of Example 17 for image sticking of a displayed image in the manner described in Example 1. The image sticking fading time was thirty minutes or less in each of the three liquid crystal display devices. It was thus confirmed that the tested liquid crystal display devices had fine image sticking characteristics.

The three liquid crystal display devices that have the three types of liquid crystal panel 1 of Example 17 were also measured for transmittance and luminance. It was confirmed as a result that the measured liquid crystal display device had as fine characteristics as those of conventional liquid crystal display devices in terms of both transmittance and luminance.

EXAMPLE 19

This example is the same as Example 8, except that the combined specific resistance of the first alignment film 606 and the first alignment film-side transparent layer 610 on the side of the first substrate 6 and the combined specific resistance of the second alignment film 705 and the second alignment film-side transparent layer 710 on the side of the second substrate 7 are varied in three conditions as illustrated in the following Table 2, in the liquid crystal panel 1 of Example 8. Three liquid crystal display devices 191 to 193 were thus manufactured. The first alignment film-side transparent layer 610 and the second alignment film-side transparent layer 710 use the polysiloxane-based material A as in Example 8.

TABLE 2

| Liquid crystal display | First substrate side (Ωcm) | Second substrate side (Ωcm) |
|---|---|---|
| 191 | 1.0E+14 | 1.0E+15 |
| 192 | 5.0E+12 | 8.0E+15 |
| 193 | 1.0E+11 | 1.0E+16 |

In each of the three sets of an alignment film and a transparent layer, the combined transmittance of the alignment film and the transparent layer was 97.5% or higher. Each value of specific resistance in Table 2 is a value obtained by combining two layers, an alignment film and a transparent layer, in their film thickness direction.

The inventors of the present invention tested three liquid crystal display devices that have the three types of liquid crystal panel 1 of Example 19 for image sticking of a displayed image in the manner described in Example 1. The image sticking fading time was thirty minutes or less in each of the three liquid crystal display devices. It was thus confirmed that the tested liquid crystal display devices had fine image sticking characteristics.

The three liquid crystal display devices including the three types of liquid crystal panel 1 of Example 19 were also measured for transmittance and luminance. It was confirmed as a result that the measured liquid crystal display device had as fine characteristics as those of conventional liquid crystal display devices in terms of both transmittance and luminance.

COMPARATIVE EXAMPLE 1

In this comparative example, a liquid crystal display device was manufactured in the same way as in Example 1, except that the first alignment film-side transparent layer 610 was not formed in the liquid crystal panel 1 of Example 1. The inventors of the present invention tested a liquid crystal display device including the liquid crystal panel 1 of Comparative Example 1 for image sticking of a displayed image in the manner described in Example 1. The result showed that the image sticking fading time was three hours.

COMPARATIVE EXAMPLE 2

In this comparative example, a liquid crystal display device was manufactured in the same way as in Example 2, except that the first alignment film-side transparent layer 610 was not formed in the liquid crystal panel 1 of Example 2. The inventors of the present invention tested a liquid crystal display device including the liquid crystal panel 1 of Comparative Example 2 for image sticking of a displayed image in the manner described in Example 2. The result showed that the image sticking fading time was four hours.

COMPARATIVE EXAMPLE 3

In this comparative example, a liquid crystal display device was manufactured in the same way as in Example 3, except that the first alignment film-side transparent layer 610 and the second alignment film-side transparent layer 710 were not formed in the liquid crystal panel 1 of Example 3. The inventors of the present invention tested a liquid crystal display device including the liquid crystal panel 1 of Comparative Example 1 for image sticking of a displayed image in the manner described in Example 3. The result showed that the image sticking fading time was two hours.

COMPARATIVE EXAMPLE 4

In this comparative example, a liquid crystal display device was manufactured in the same way as in Example 14, except that the first alignment film-side transparent layer 610 was not formed in the liquid crystal panel 1 of Example 14.

The inventors of the present invention tested a liquid crystal display device including the liquid crystal panel 1 of Comparative Example 4 for image sticking of a displayed image in the manner described in Example 14. The result showed that the image sticking fading time was five and a half hours.

COMPARATIVE EXAMPLE 5

In this comparative example, a liquid crystal display device was manufactured in the same way as in Example 15, except that the first alignment film-side transparent layer 610 was not formed in the liquid crystal panel 1 of Example 15. The inventors of the present invention tested a liquid crystal display device including the liquid crystal panel 1 of Comparative Example 5 for image sticking of a displayed image in the manner described in Example 15. The result showed that the image sticking fading time was six and a half hours.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A liquid crystal display device comprising:
   a first substrate;
   a second substrate;

a liquid crystal layer interposed between the first substrate and the second substrate;

a pixel electrode placed on the first substrate for applying an electric field to the liquid crystal layer to control liquid crystal molecules;

a first alignment film placed on the first substrate, with a side thereof adjacent the liquid crystal layer;

a second alignment film placed on the second substrate, with a side thereof adjacent the liquid crystal layer, the first and second alignment films sandwiching the liquid crystal layer; and at least one of: a first transparent layer that is in contact with a side of the first alignment film opposite to the side thereof adjacent to the liquid crystal layer and that is lower in volume resistivity than the first alignment film; and a second transparent layer that is in contact with a side of the second alignment film opposite to the side thereof adjacent to the liquid crystal layer and that is lower in volume resistivity than the second alignment film, wherein the at least one of the first transparent layer and the second transparent layer is formed from an organic resin material selected from the group consisting of polyisothianaphthene, poly-3,4-ethylenedioxythiophene, and polypyrrole.

2. The liquid crystal display device according to claim 1, wherein the at least one of the first transparent layer and the second transparent layer is a separate layer from the pixel electrode and a common electrode of the liquid crystal display device.

3. The liquid crystal display device according to claim 1, wherein the at least one of the first transparent layer and the second transparent layer is a layer formed by a wet process.

4. The liquid crystal display device according to claim 1, wherein the at least one of the first transparent layer and the second transparent layer has a volume resistivity of $1.0E+9$ $\Omega$cm or more and $5.0E+13$ $\Omega$cm or less, and wherein at least one of the first alignment film and the second alignment film, in contact with the at least one of the first transparent layer and the second transparent layer, has a volume resistivity of $1.0E+14$ $\Omega$cm or more.

* * * * *